(12) United States Patent
Panigrahi et al.

(10) Patent No.: US 11,184,244 B2
(45) Date of Patent: Nov. 23, 2021

(54) METHOD AND SYSTEM THAT DETERMINES APPLICATION TOPOLOGY USING NETWORK METRICS

(71) Applicant: VMWARE, INC., Palo Alto, CA (US)

(72) Inventors: Susobhit Panigrahi, Bangalore (IN); Reghuram Vasanthakumari, Bangalore (IN); Arihant Jain, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/794,262

(22) Filed: Feb. 19, 2020

(65) Prior Publication Data

US 2021/0099354 A1 Apr. 1, 2021

(30) Foreign Application Priority Data

Sep. 29, 2019 (IN) .............................. 201941039379

(51) Int. Cl.
| | | |
|---|---|---|
| *G06F 15/173* | (2006.01) | |
| *H04L 12/24* | (2006.01) | |
| *G06F 9/455* | (2018.01) | |
| *H04L 29/08* | (2006.01) | |
| *H04L 12/26* | (2006.01) | |

(52) U.S. Cl.
CPC .......... *H04L 41/12* (2013.01); *G06F 9/45558* (2013.01); *H04L 41/14* (2013.01); *H04L 43/08* (2013.01); *H04L 67/10* (2013.01); *G06F 2009/45583* (2013.01)

(58) Field of Classification Search
CPC ......... H04L 41/12; H04L 67/10; H04L 43/08; H04L 41/14
See application file for complete search history.

(56) References Cited

U.S. PATENT DOCUMENTS

| | | | |
|---|---|---|---|
| 9,323,599 B1* | 4/2016 | Iyer ..................... | G06F 9/45508 |
| 10,212,041 B1* | 2/2019 | Rastogi ................ | H04L 43/08 |
| 10,291,479 B1* | 5/2019 | Oren .................... | H04L 41/22 |
| 2010/0131269 A1* | 5/2010 | Park ................. | G10K 11/17837 |
| | | | 704/233 |
| 2012/0023230 A1* | 1/2012 | Hosking ............... | H04L 43/026 |
| | | | 709/224 |
| 2020/0364128 A1* | 11/2020 | Vittal .................. | G06F 9/45558 |

* cited by examiner

*Primary Examiner* — Padma Mundur

(57) ABSTRACT

The current document is directed to methods and systems that employ network metrics collected by distributed-computer-system metrics-collection services to determine a service-call-based topology for distributed service-oriented applications. In a described implementation, network metrics are collected over a number of network-metric monitoring periods. Independent component analysis is used to extract, from the collected network metrics, signals corresponding to sequences of service calls initiated by calls to the application-programming interface of a distributed service-oriented application. The signals, in combination with call traces obtained from a distributed-services call-tracing utility or service, are then used to construct representations of distributed-service-oriented-application topologies. The distributed-service-oriented-application topologies provide a basis for any additional types of distributed-computer-system functionalities, utilities, and facilities.

20 Claims, 33 Drawing Sheets

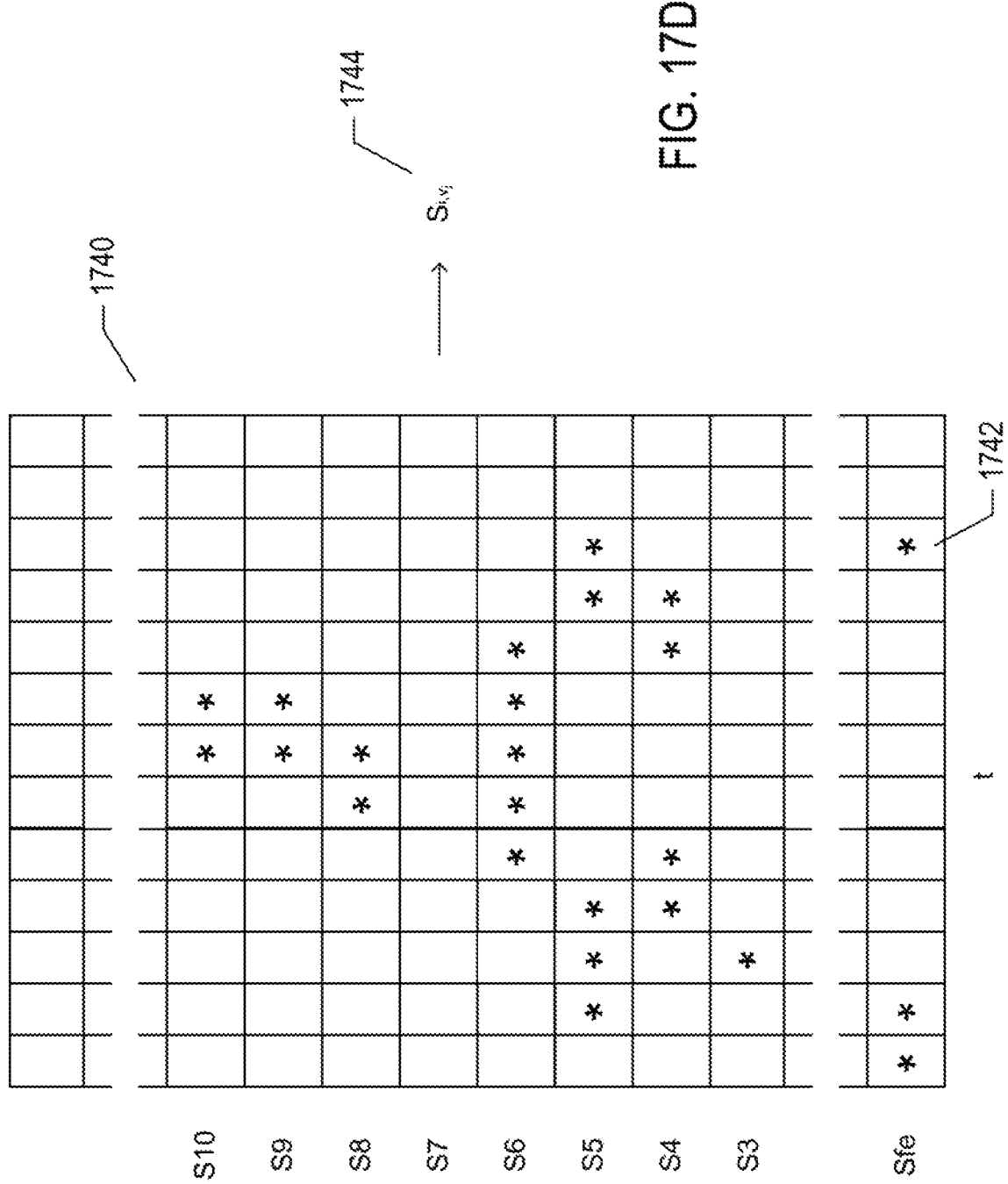

observation: $x^0_{i,v_j}, x^1_{i,v_j}, x^2_{i,v_j}, \ldots, x^{M-1}_{i,v_j} \equiv \mathbf{x}$ — 1746
api call signals: $s^0_{i,v_j}, s^1_{i,v_j}, s^2_{i,v_j}, \ldots, s^{M-1}_{i,v_j} \equiv \mathbf{s}$ — 1748

$x^k = a_{k,0} s^0_{i,v_j} + a_{k,1} s^1_{i,v_j} + a_{k,2} s^2_{i,v_j} + \ldots + a_{k,M-1} s^{M-1}_{i,v_j}$ — 1750

$\mathbf{a}_k = a_{k,0}, a_{k,1}, a_{k,2}, \ldots, a_{k,M-1}$ $$\mathbf{A} = \begin{bmatrix} a_{0,0} & a_{0,1} & a_{0,2} & \ldots & a_{0,M-1} \\ a_{1,0} & a_{1,1} & a_{1,2} & \ldots & a_{1,M-1} \\ & & \vdots & & \\ a_{M-1,0} & a_{M-1,1} & a_{M-1,2} & \ldots & a_{M-1,M-1} \end{bmatrix}$$ — 1752

$$\begin{bmatrix} x^0_{i,v_j} \\ x^1_{i,v_j} \\ x^2_{i,v_j} \\ \vdots \\ x^{M-1}_{i,v_j} \end{bmatrix} = \mathbf{A} \begin{bmatrix} s^0_{i,v_j} \\ s^1_{i,v_j} \\ s^2_{i,v_j} \\ \vdots \\ s^{M-1}_{i,v_j} \end{bmatrix}$$

$\mathbf{x}^T$ — 1754    $\mathbf{s}^T$ — 1756

$\mathbf{s}^T = \mathbf{A}^{-1} \mathbf{x}^T$ — 1758
$\phantom{\mathbf{s}^T} = \mathbf{W} \mathbf{x}^T$ — 1754
— 1756

FIG. 17E $P(s^k_{i,y_j} > \text{threshold}) = P(s^k_{i,y_j})$ — 1762

$I(s^x, s^y) = \sum_i \sum_j P(s^x_{i,y_j}) P(s^y_{i,y_j}) \log \frac{P(s^x_{i,y_j}, s^y_{i,y_j})}{P(s^x_{i,y_j}) P(s^y_{i,y_j})}$ — 1764

$I(s) = \sum_{k=0}^{M-1} \sum_{l=k}^{M-1} I(s^k, s^l)$ — 1766

$\arg\min\ I(s)$
$x = W^{-1} s$ — 1768

FIG. 17F

METHOD AND SYSTEM THAT DETERMINES APPLICATION TOPOLOGY USING NETWORK METRICS

RELATED APPLICATIONS

Benefit is claimed under 35 U.S.C. 119(a)-(d) to Foreign Application Serial No. 201941039379 filed in India entitled "METHOD AND SYSTEM THAT DETERMINES APPLICATION TOPOLOGY USING NETWORK METRICS", on Sep. 29, 2019, by VMware, Inc., which is herein incorporated in its entirety by reference for all purposes.

TECHNICAL FIELD

The current document is directed to distributed-computer-system and distributed-application administration and management and, in particular, to methods and systems that determine the topology of service-oriented, distributed applications.

BACKGROUND

During the past seven decades, electronic computing has evolved from primitive, vacuum-tube-based computer systems, initially developed during the 1940s, to modern electronic computing systems in which large numbers of multiprocessor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management-and-administration facilities related to distributed computing systems are seeking new approaches to implementing automated management-and-administration facilities and functionalities.

SUMMARY

The current document is directed to methods and systems that employ network metrics collected by distributed-computer-system metrics-collection services to determine a service-call-based topology for distributed service-oriented applications. In a described implementation, network metrics are collected over a number of network-metric monitoring periods. Independent component analysis is used to extract, from the collected network metrics, signals corresponding to sequences of service calls initiated by calls to the application-programming interface of a distributed service-oriented application. The signals, in combination with call traces obtained from a distributed-services call-tracing utility or service, are then used to construct representations of distributed-service-oriented-application topologies. The distributed-service-oriented-application topologies provide a basis for any additional types of distributed-computer-system functionalities, utilities, and facilities.

BRIEF DESCRIPTION OF THE DRAWINGS

FIGS. 17A-F illustrate a method for extracting component-service-node-disturbance signals from observed network metrics used in certain implementations of the currently disclosed methods and systems.

DETAILED DESCRIPTION

Figure 1:
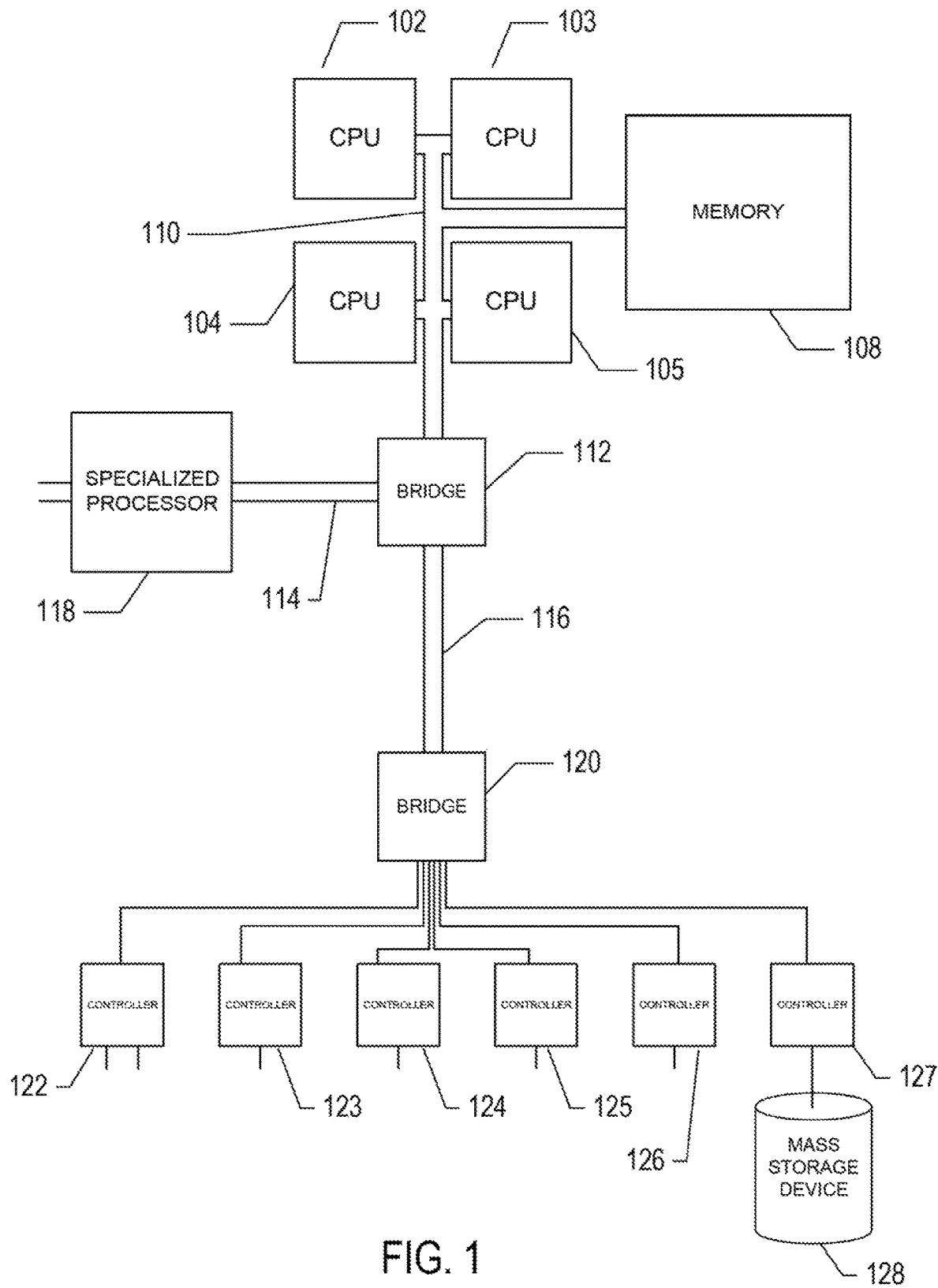
FIG. 1 provides a general architectural diagram for various types of computers.

The current document is directed to methods and systems that employ network metrics to determine the topology use of distributed service-oriented applications. In a first subsection, below, a detailed description of computer hardware, complex computational systems, and virtualization is provided with reference to FIGS. 1-10. In a second subsection, the methods and systems to which the current document is directed are discussed, with reference to FIGS. 11-19.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
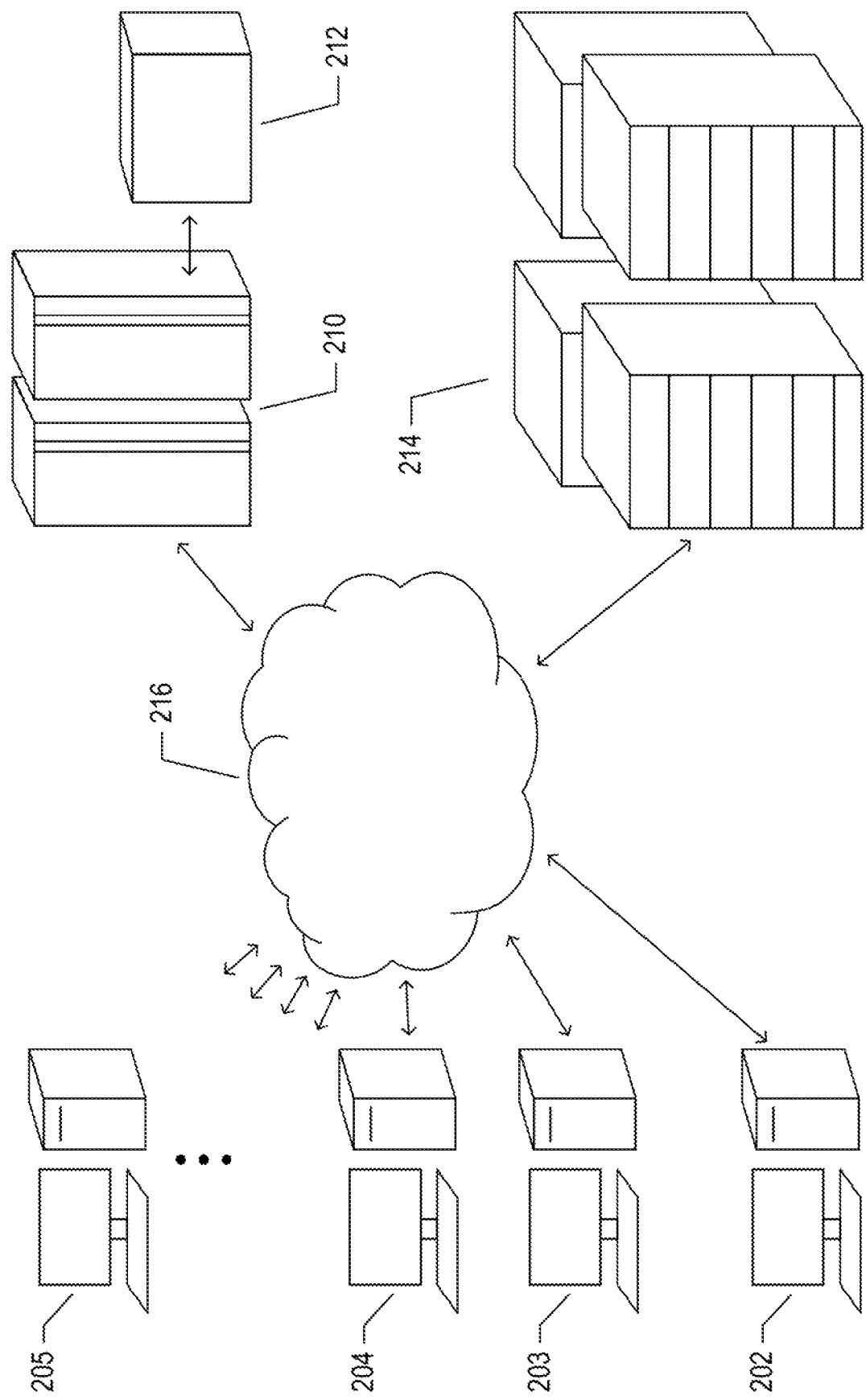
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
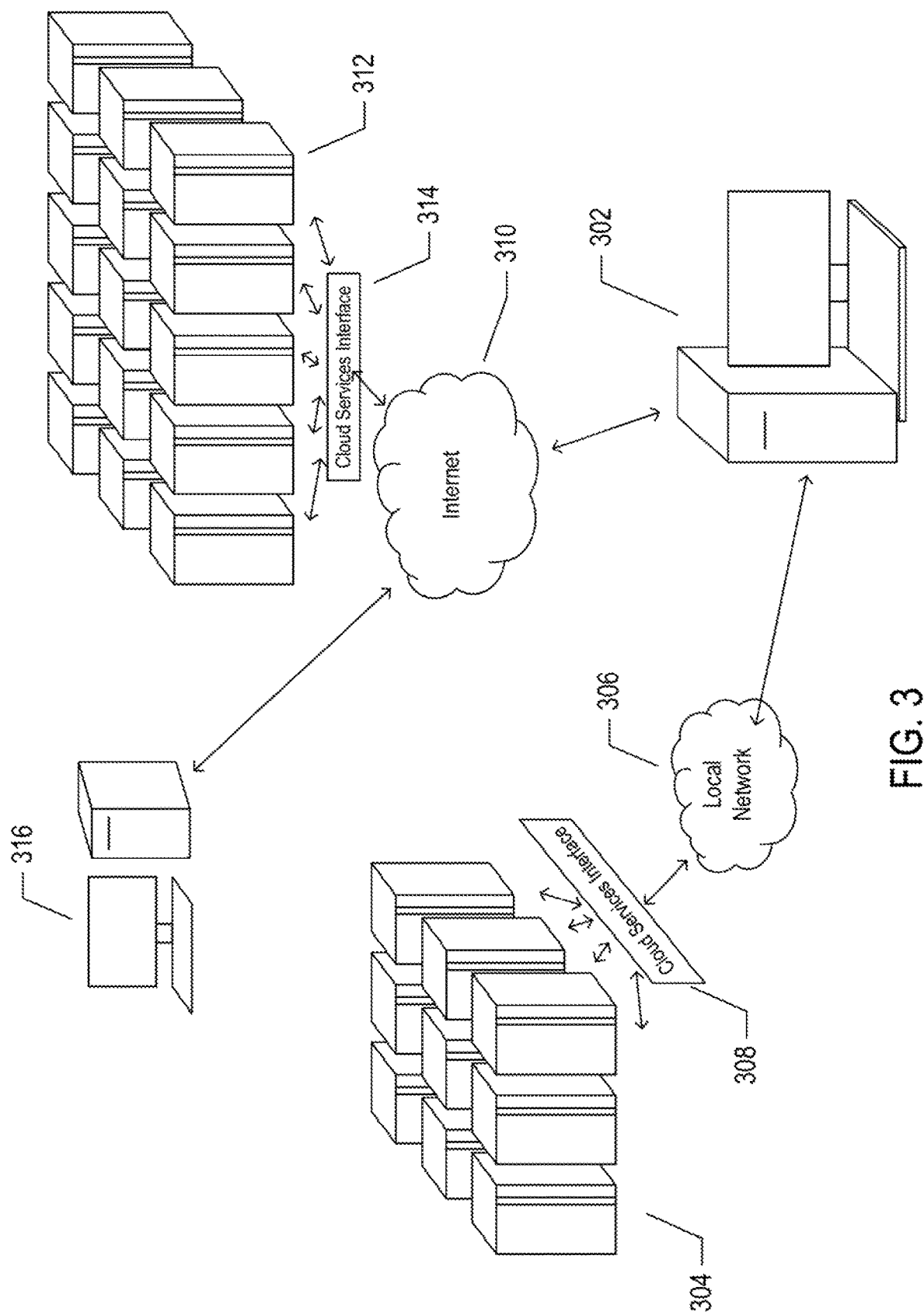
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
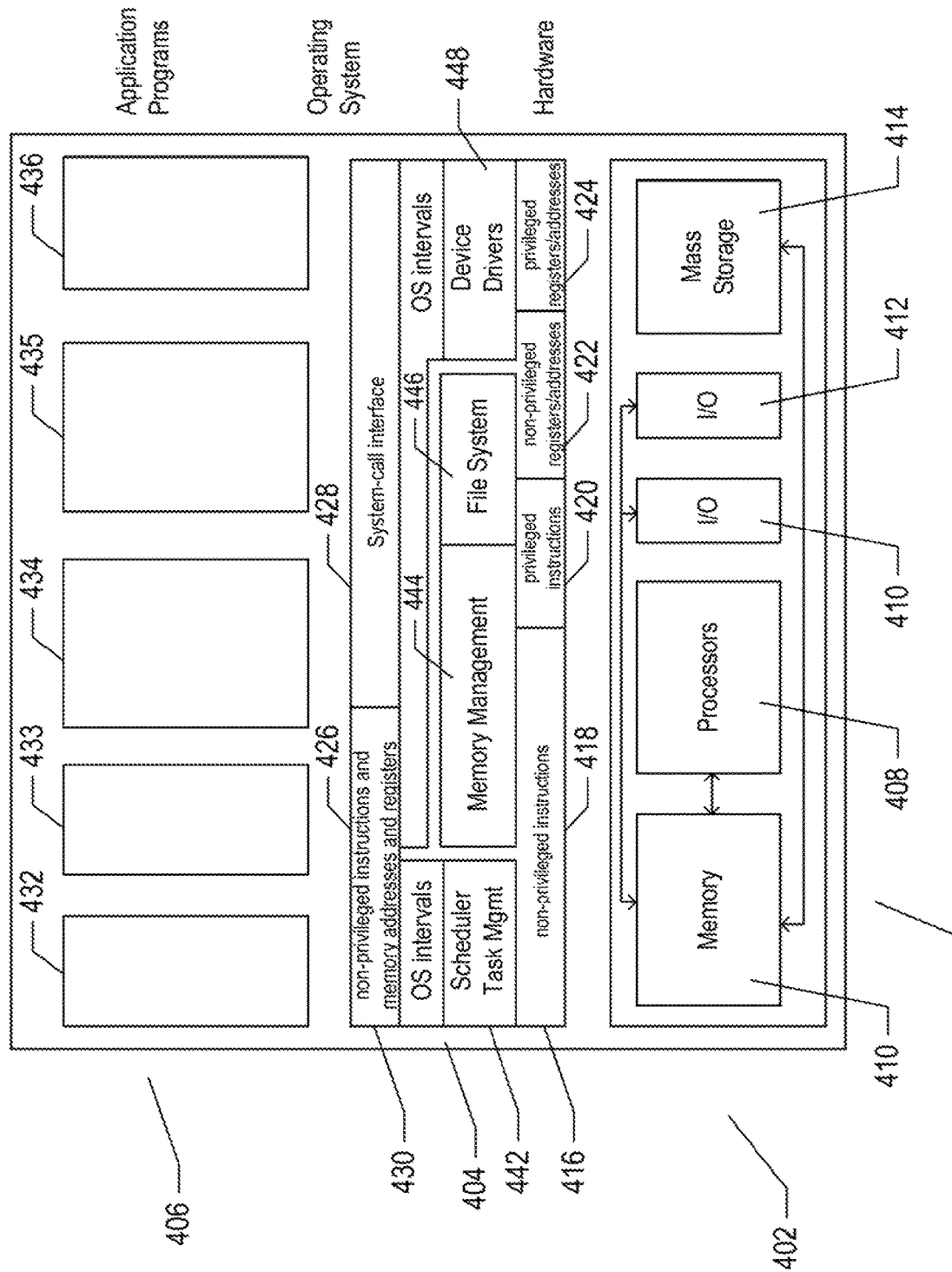
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406.

The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
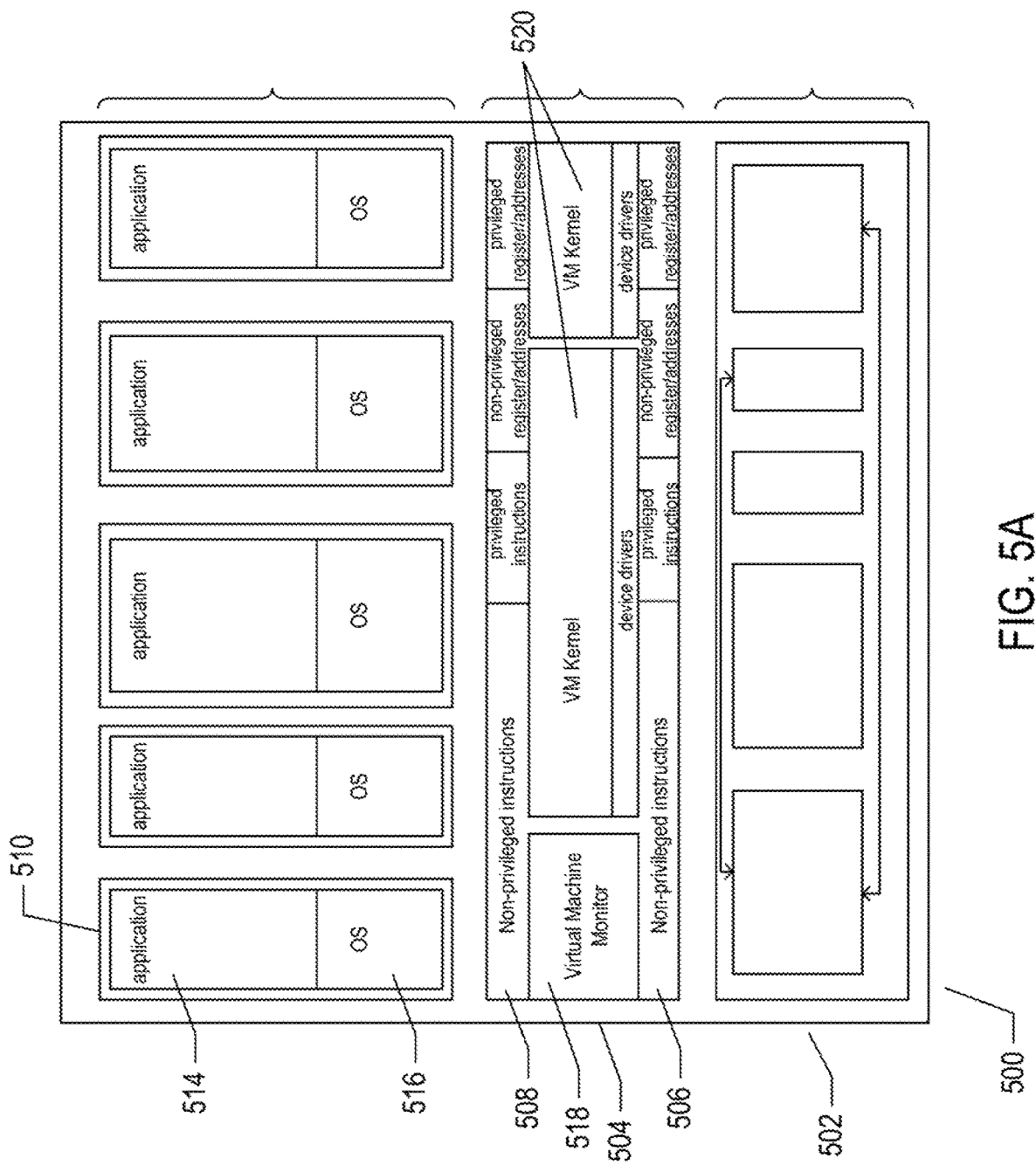
FIGS. 5A-D illustrate two types of virtual machine and virtual-machine execution environments.
Figure 5B:
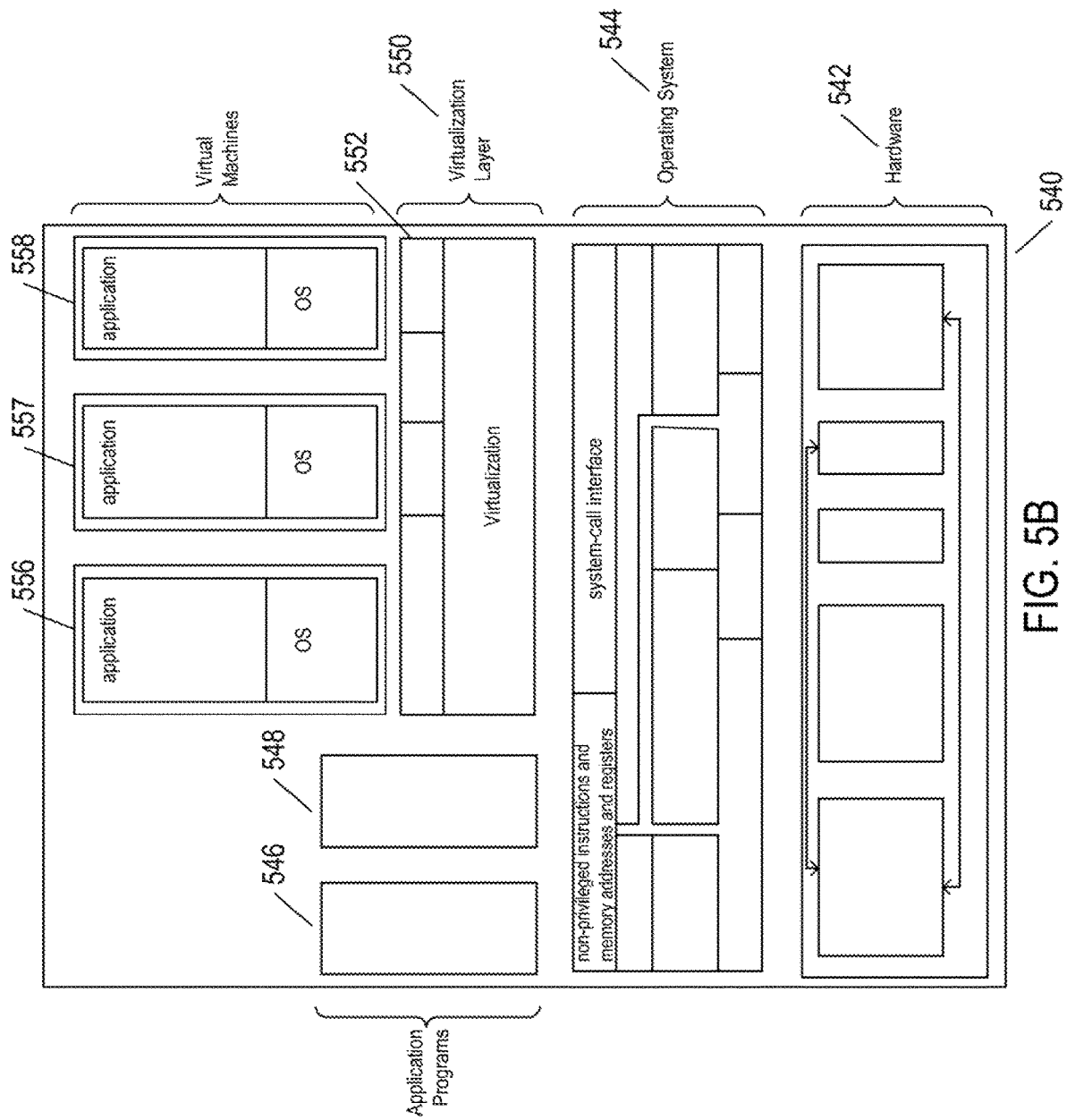

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In Figure 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
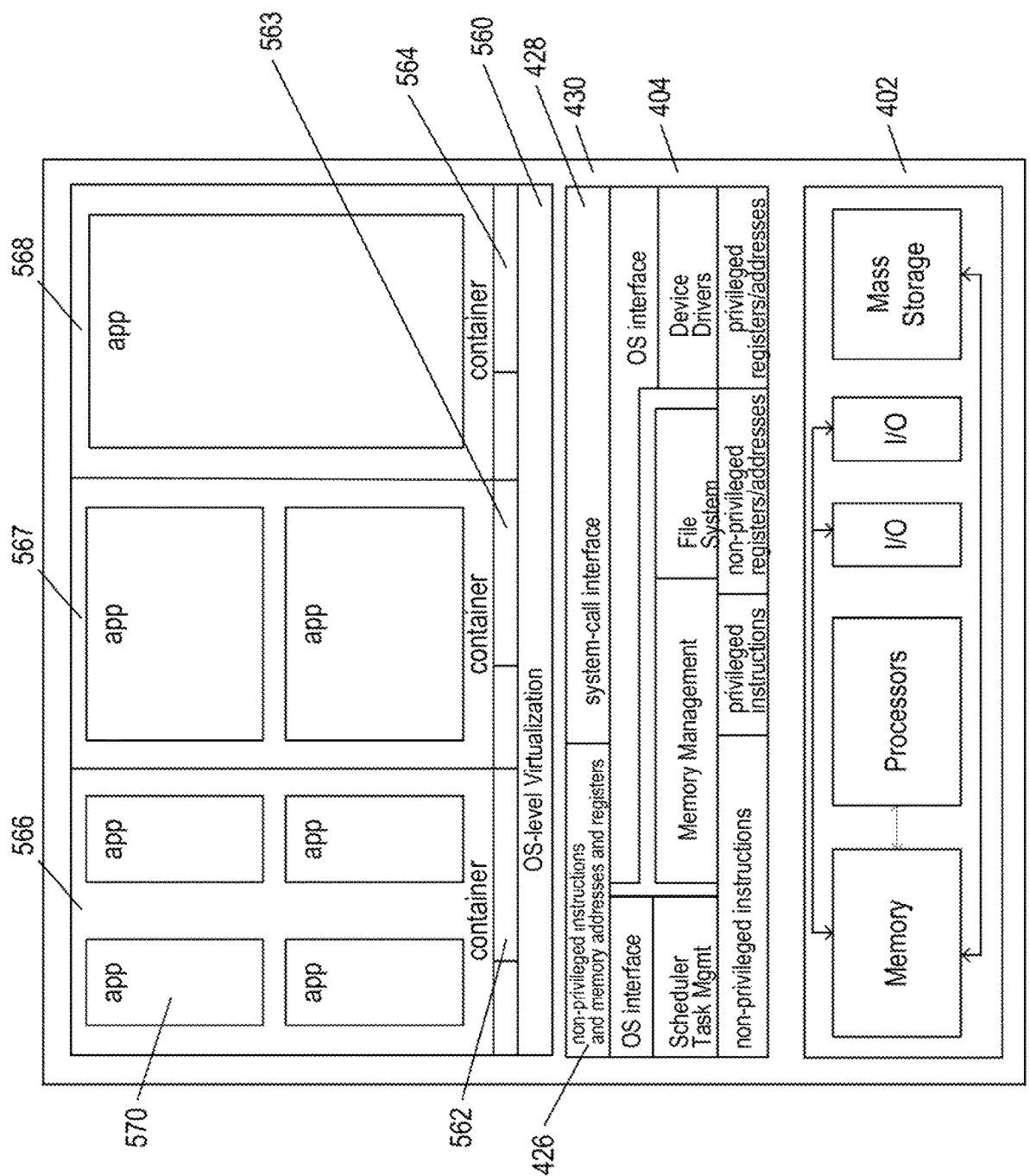

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
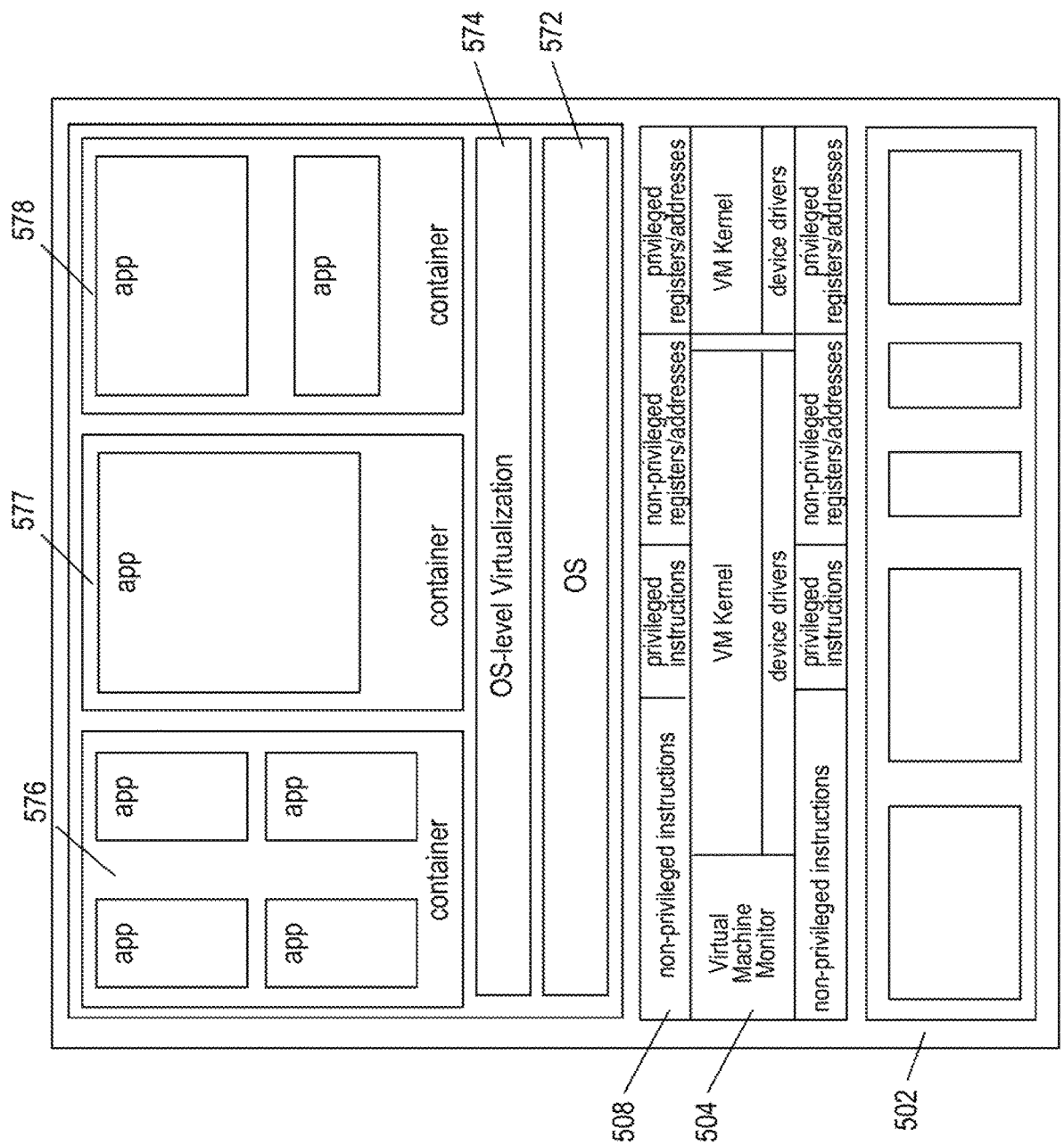

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
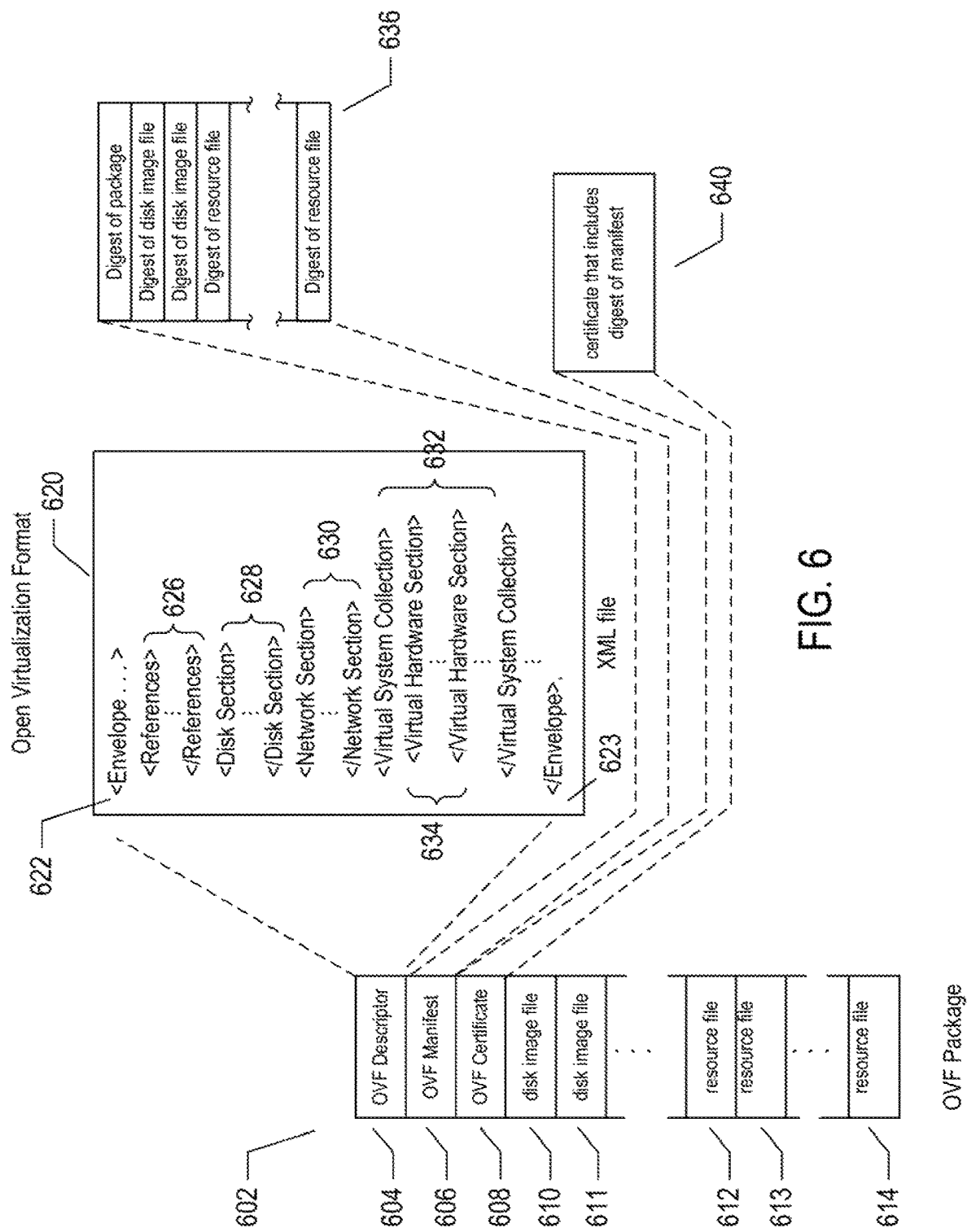
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
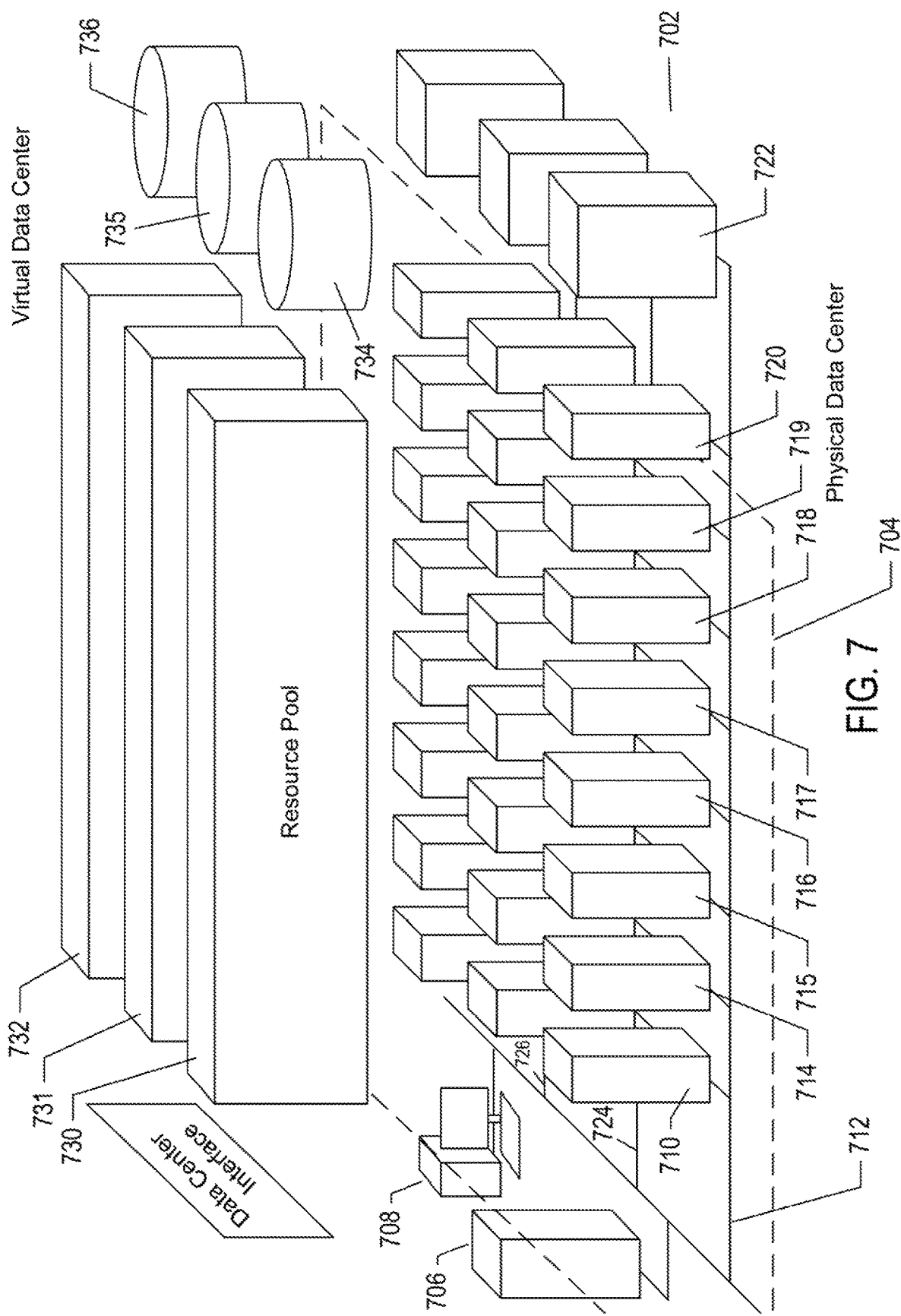
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
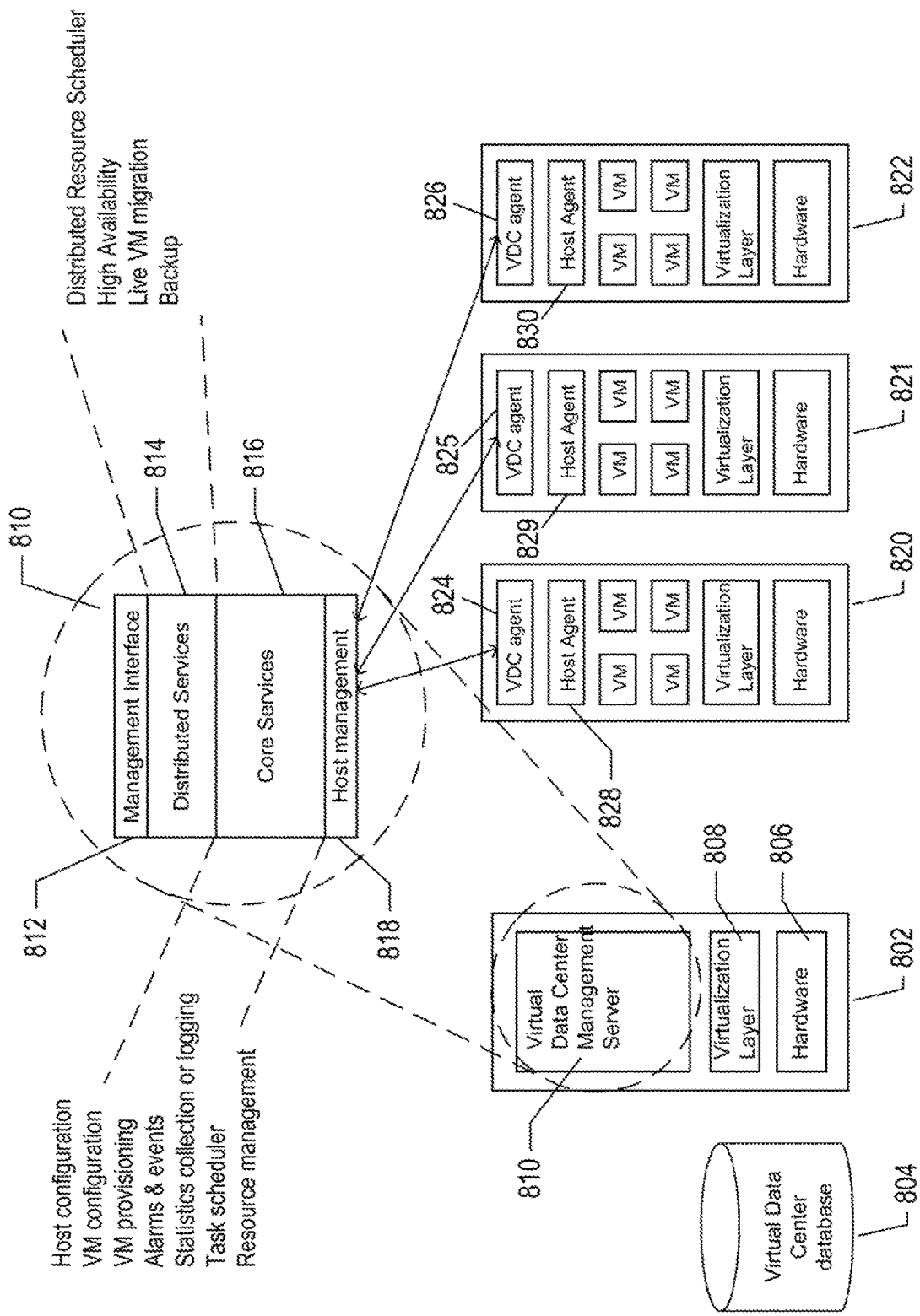
FIG. 8 illustrates virtual-machine components of a VI-management-server and physical servers of a physical data center above which a virtual-data-center interface is provided by the VI-management-server.

FIG. 8 illustrates virtual-machine components of a V-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
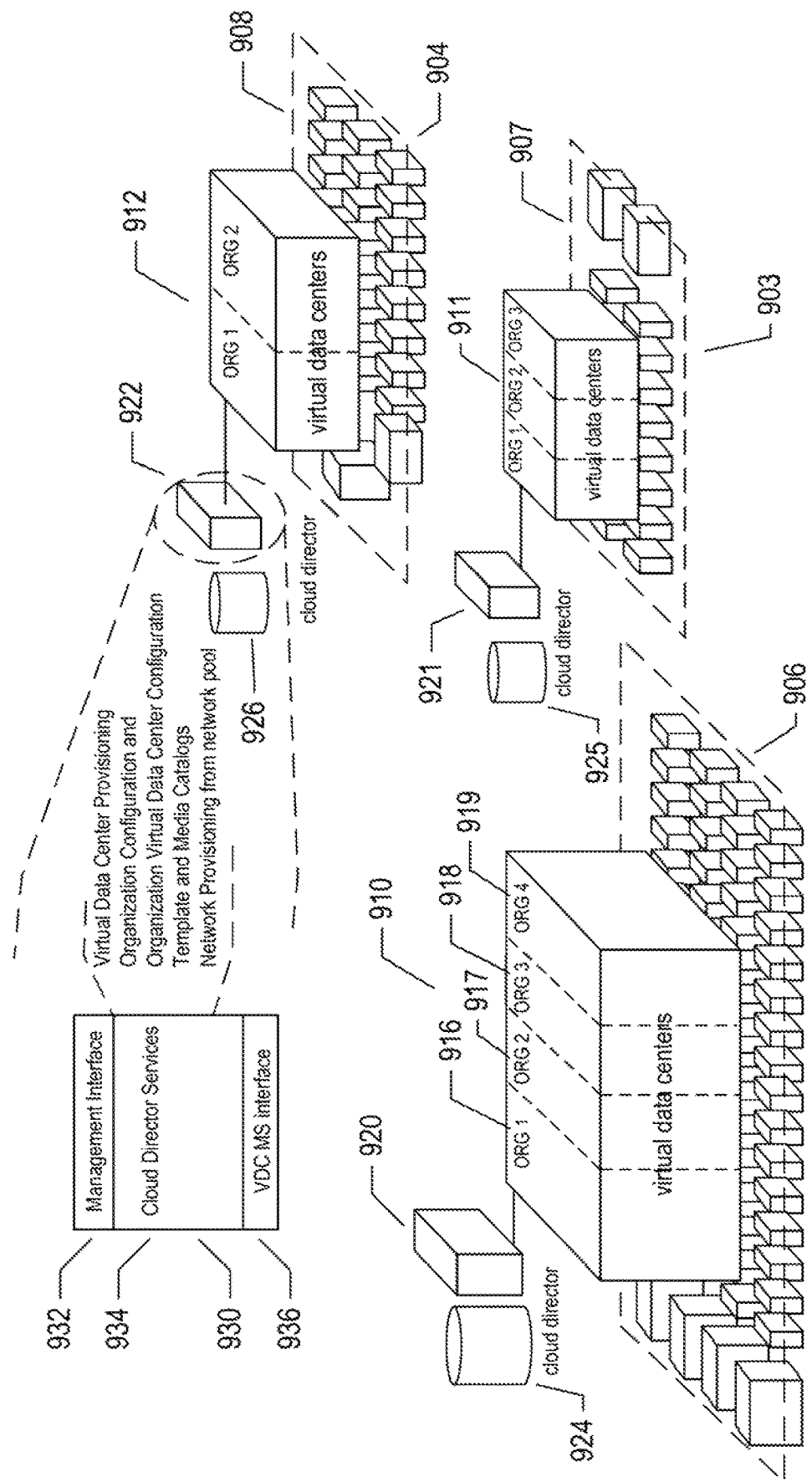
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
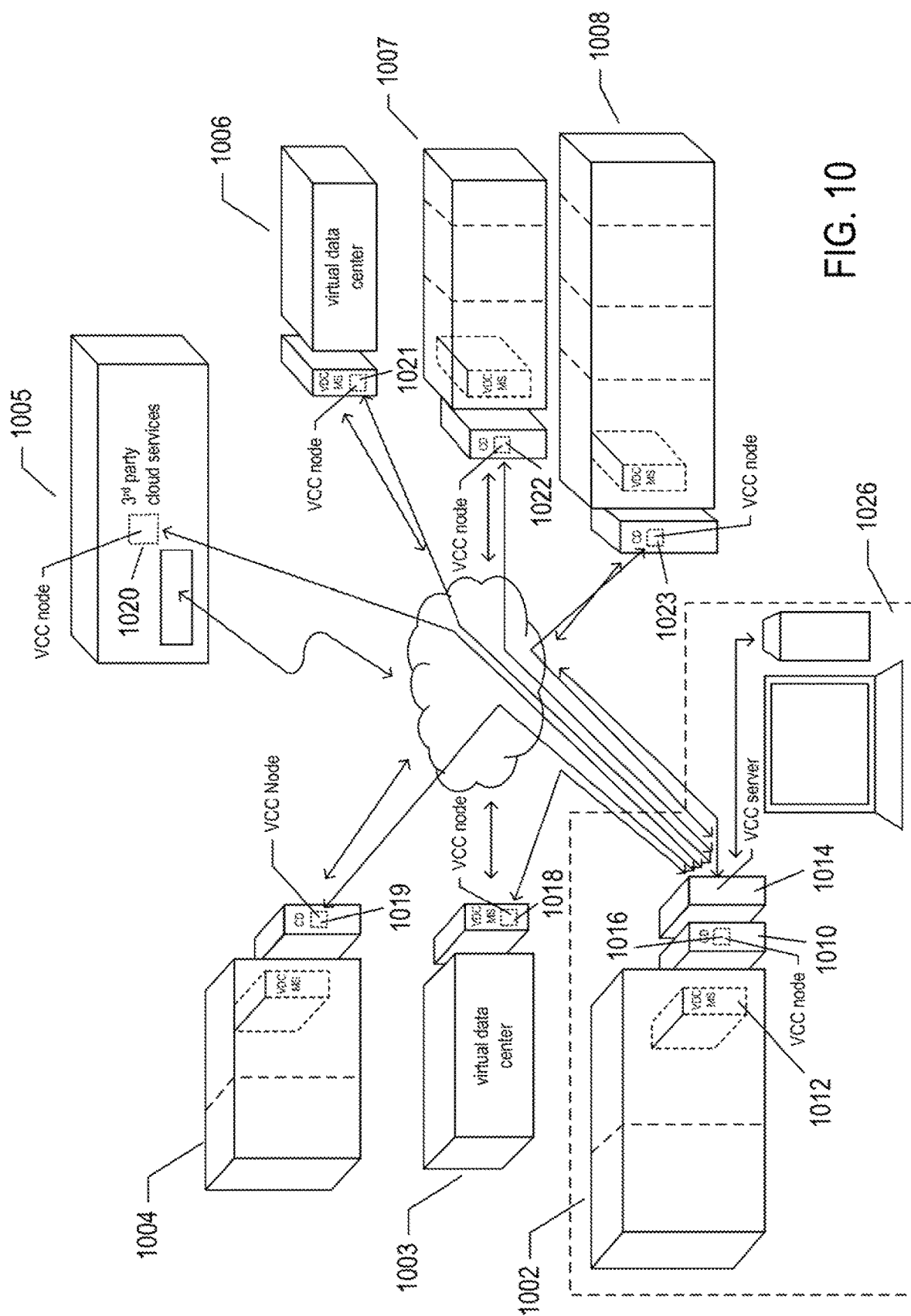
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

Figure 11:
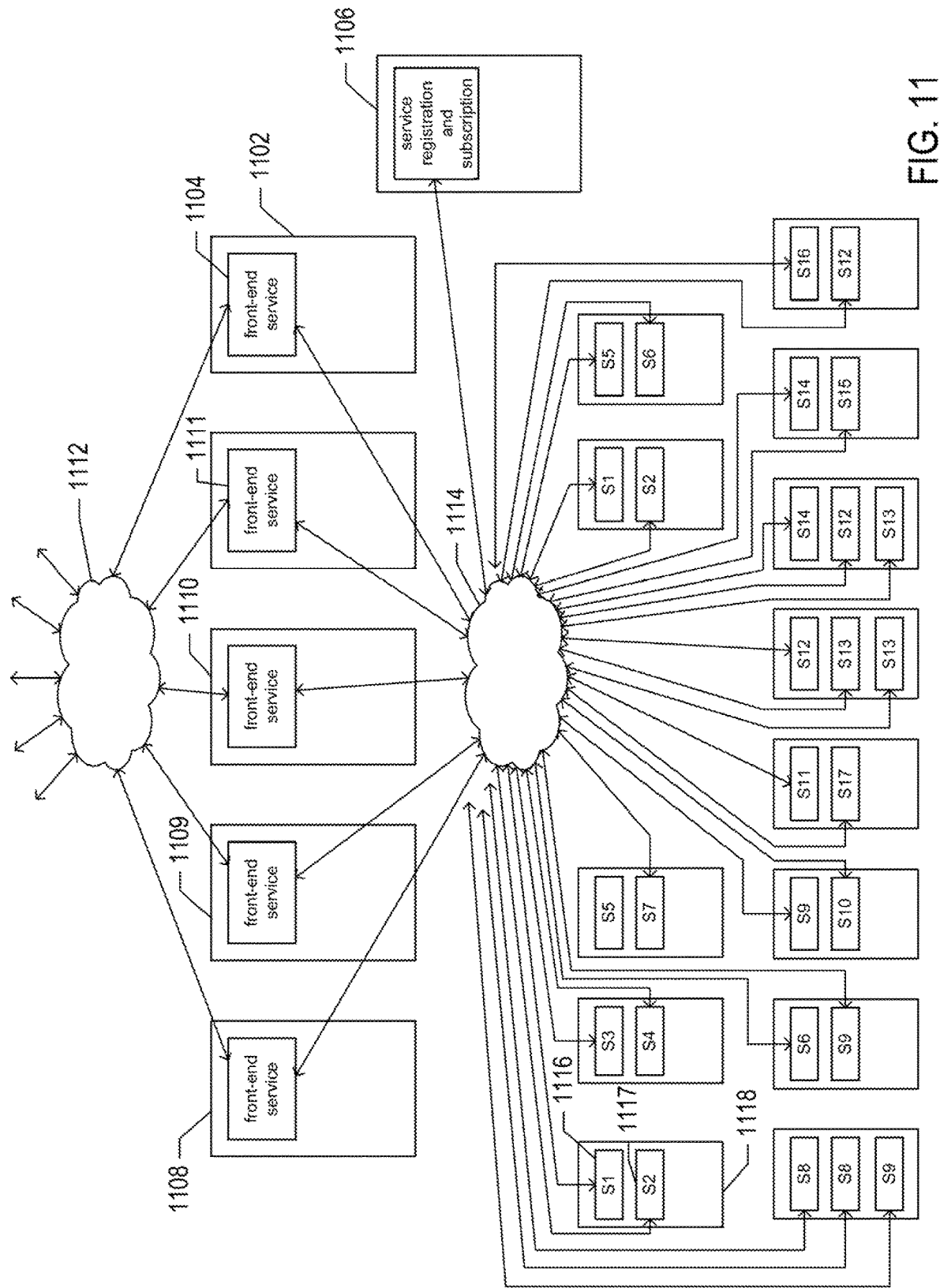
FIG. 11 illustrates a distributed service-oriented application.

FIG. 11 illustrates a distributed service-oriented application. In FIG. 11, a number of servers, such as server 1102, are shown within a distributed computer system. The servers run various different services, such as front-end service 1104. Services are executables that provide functionality to other computational entities through a service interface, such as a RESTful application programming interface ("API") accessed through network communications using REST-protocol requests. A distributed service-oriented application can be considered to be a collection of various different services, running within virtual machines executing within servers of one or more distributed computer systems, that cooperate to implement a distributed application. The component services of the distributed application are often registered with a registration-and-subscription service 1106 to which other services can subscribe in order to receive updates with regard to the addition, removal, and changes to the array of available service components. In the distributed service-oriented application illustrated in FIG. 11, a set of front-end-service instantiations 1104 and 1108-1111 communicate with remote clients and users through the Internet 1112 and communicate, via local-area networks and wide-area networks within the distributed computer system, with the many different service instantiations within the distributed computer system that together comprise the distributed service-oriented application, such as services 1116 and 1117 running within server 1118. In many cases, the logic and stored information that organized a set of services into a distributed service-oriented application is private to an owner of cloud-computing-system tenant, as a result of which administrators and managers of a distributed computer system may not be able to straightforwardly determine the current topologies of the distributed service-oriented applications running within the data centers and cloud-computing facilities that they manage and administer. In addition, many distributed service-oriented applications may be composed of a very large number of services, and the service instances which together compose a distributed service-oriented application may be quite dynamic, automatically expanding and contracting in response to varying workloads and additional constraints and computational-environment conditions, so that even those who manage and administer the distributed service-oriented applications may have need for automated methods that determine and monitor distributed-service-oriented-application topologies.

Figure 12A:
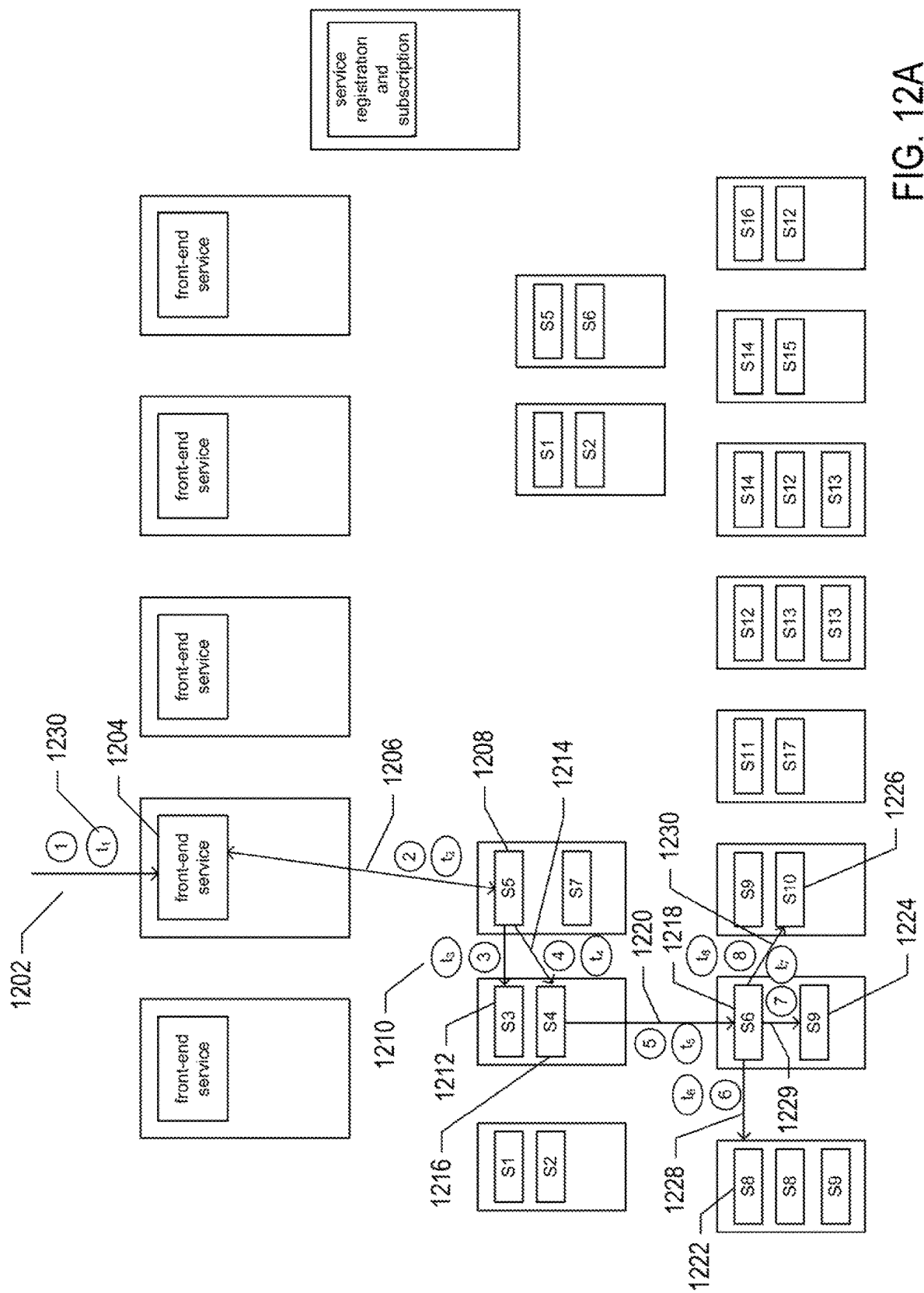
FIGS. 12A-B illustrate a sequence of service calls that implement a particular distributed-service-oriented-application API call or entry point.
Figure 12B:
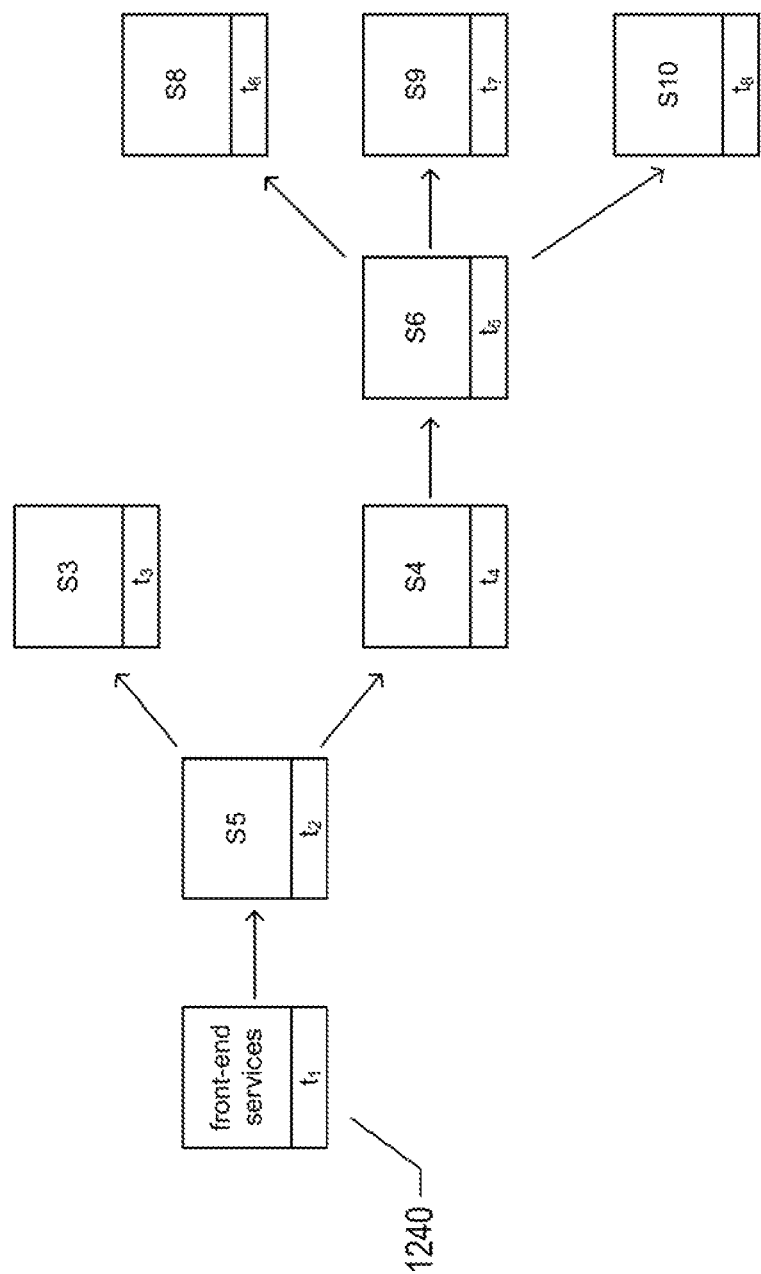

FIGS. 12A-B illustrate a sequence of service calls that implement a particular distributed-service-oriented-application API call or entry point. In a first step 1202, a remote user or client sends a request to the distributed service-oriented application, resulting in a call to one of the front-end-service instances 1204. The front-end-service instance, in a second step 1206, calls a component-service instance 1208 in order to launch execution of the distributed-service-oriented-application request-handling machinery for the received request. In FIG. 12A and in subsequent figures and discussions, the component services are referred to by alphanumeric labels, such as the label "S5" for the component service that includes the component-service instance 1208. In a third step 1210, component-service instance S5 calls component service S3 1212. In a fourth step 1214, component service S5 calls component-service instance S4 1216 which, in turn, calls component-service instance S6 1218 in a fifth step 1220. Component-service instance S6 then calls the additional component-service instances S8 1222, S9 1224, and S10 1226 in steps 1228 1229 and 1230, respectively. Each of the various component services carry out certain tasks and functionalities that contribute to execution of the user or client request. For example, component-service instance S5 1208 may receive and queue the request, call component-service instance S3 1212 to authenticate and authorize the request, and then call component-service instance S4 1216 to parse and to carry out the requested task. Component-service instance S6 1218 may handle a particular type of task or set of tasks, and may call data-storage-and-retrieval component-service instance S8 1222, a data-analysis component-service instance S9 1224, and a linear-algebra-computation component-service instance S10 1226, as one example. Each component-service instance call shown in FIG. 12A is associated with a timestamp, such as the timestamp 1230 associated with the initial call to the front-end service 1204.

FIG. 12B illustrates a directed graph that represents the service calls, shown in FIG. 12A, that together comprise implementation of the distributed-service-oriented application API call or entry point discussed with reference to FIG. 12A. In the case of the directed graph, or call trace, shown in FIG. 128, the graph is generalized to represent calls made to services, rather than particular service instances. A service instance is a particular service executable running on a particular hardware device, while a service is the logical service, which may be implemented by one or more service instances. For example, in FIG. 11, five different front-end-service instances together implement the front-end service. The root node of the directed graph 1240 represents the initial call to the front-end service 1204. Each remaining node in the directed graph represents a service component called by another service component of the distributed service-oriented application. Each node contains an indication of the service component as well as a timestamp for the initial call to the service component. The directed graph shown in FIG. 12B is a relatively simple directed graph. However, in more complex distributed-service-oriented application API-call implementations, the directed graph may contain cycles and a larger number of nodes.

Figure 13A:
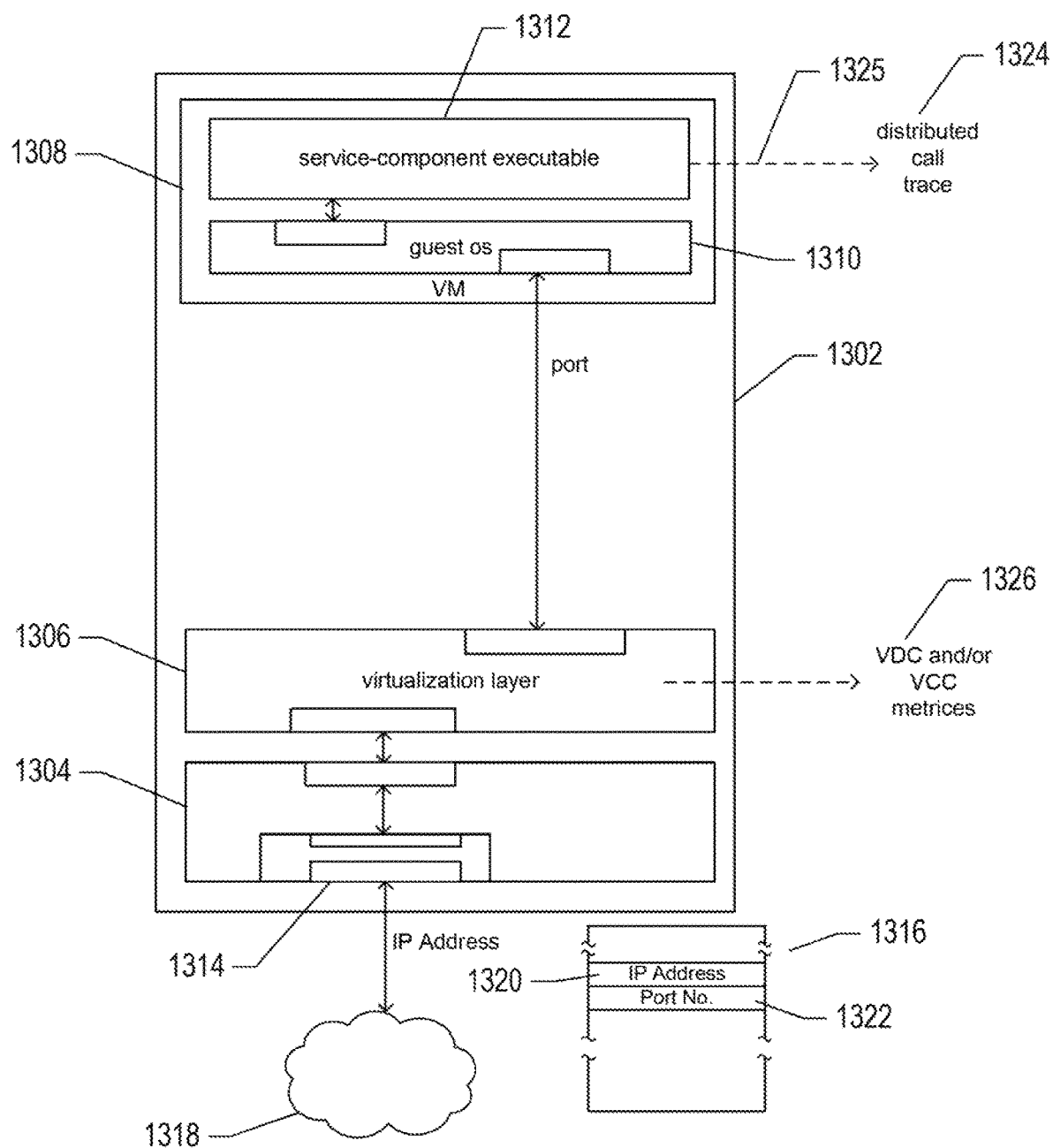
FIGS. 13A-B illustrate service components and service nodes.
Figure 13B:
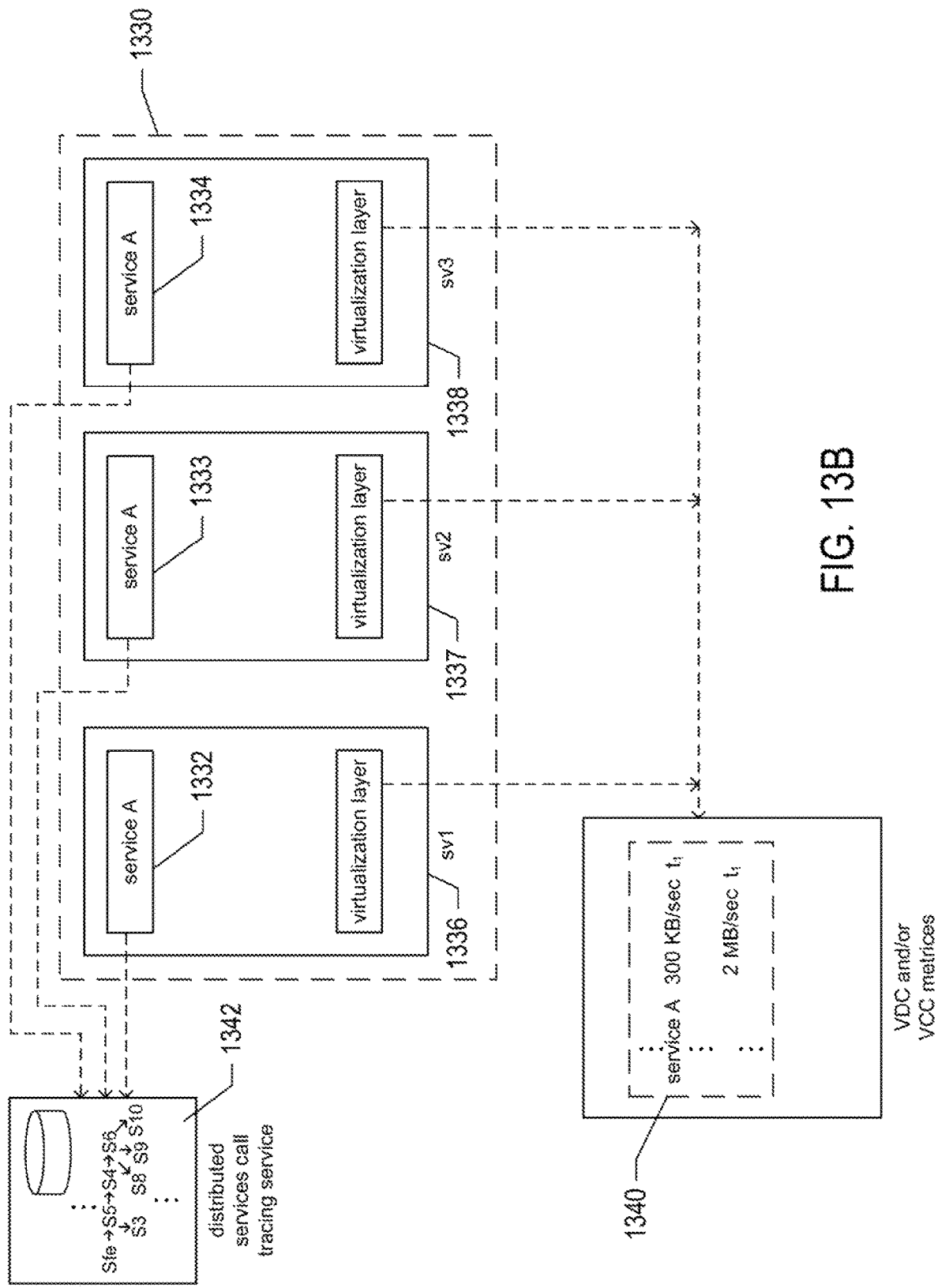

FIGS. 13A-B illustrate service components and service nodes. FIG. 13A illustrates a service component within a server of a distributed computing system. The server 1302 includes a hardware layer 1304, a virtualization layer 1306, and a virtual machine 1308, executing within the execution environment provided by the virtualization layer 1306. Of course, a server is a complex device that includes many thousands of hardware and computer-instruction-implemented components, not shown in high-level illustrations, such as FIG. 13A. Within the virtual machine, a guest operating system 1310 executes and provides an execution environment for a service-component executable 1312. The hardware layer 1304 includes one or more communications interfaces, such as communications interface 1314, through which the server computer exchanges messages, such as message 1316, with remote computational entities via one or more local networks 1318 and, in some cases, wide-area networks. Network messages, for commonly used communications hardware and protocols, generally include a target Internet-protocol address 1320, which routes the messages to the communications interface 1314, as well as a port number 1322, which routes the message through the virtualization layer and guest operating system to a particular application, such as the service-component executable 1312. The service-component executable can carry out communications with many different remote computational entities, including, as further discussed below, a distributed call-trace service 1324. Dashed arrow 1325 represents an exchange of messages via the many internal components of the server and many external components between the server and the hardware on which the distributed call-trace service executes. Similarly, the virtualization layer can carry out communications with many different remote computational entities, including a VDC or VCC management server and distributed metrics-collection services 1326.

FIG. 13B illustrates a service node. A service node within the distributed computer system is a collection of the instances of the particular service, including the portions of the underlying server that support execution of the service instances. For example, in FIG. 13B, service node 1330 includes three service-component executables 1332-1334 running on servers 1336-1338. The VDC or VCC management servers and/or distributed metrics collection service can collect aggregate metrics 1340 for the service node and the distributed call-tracing service may collect call traces 1342 for service nodes.

Figure 14A:
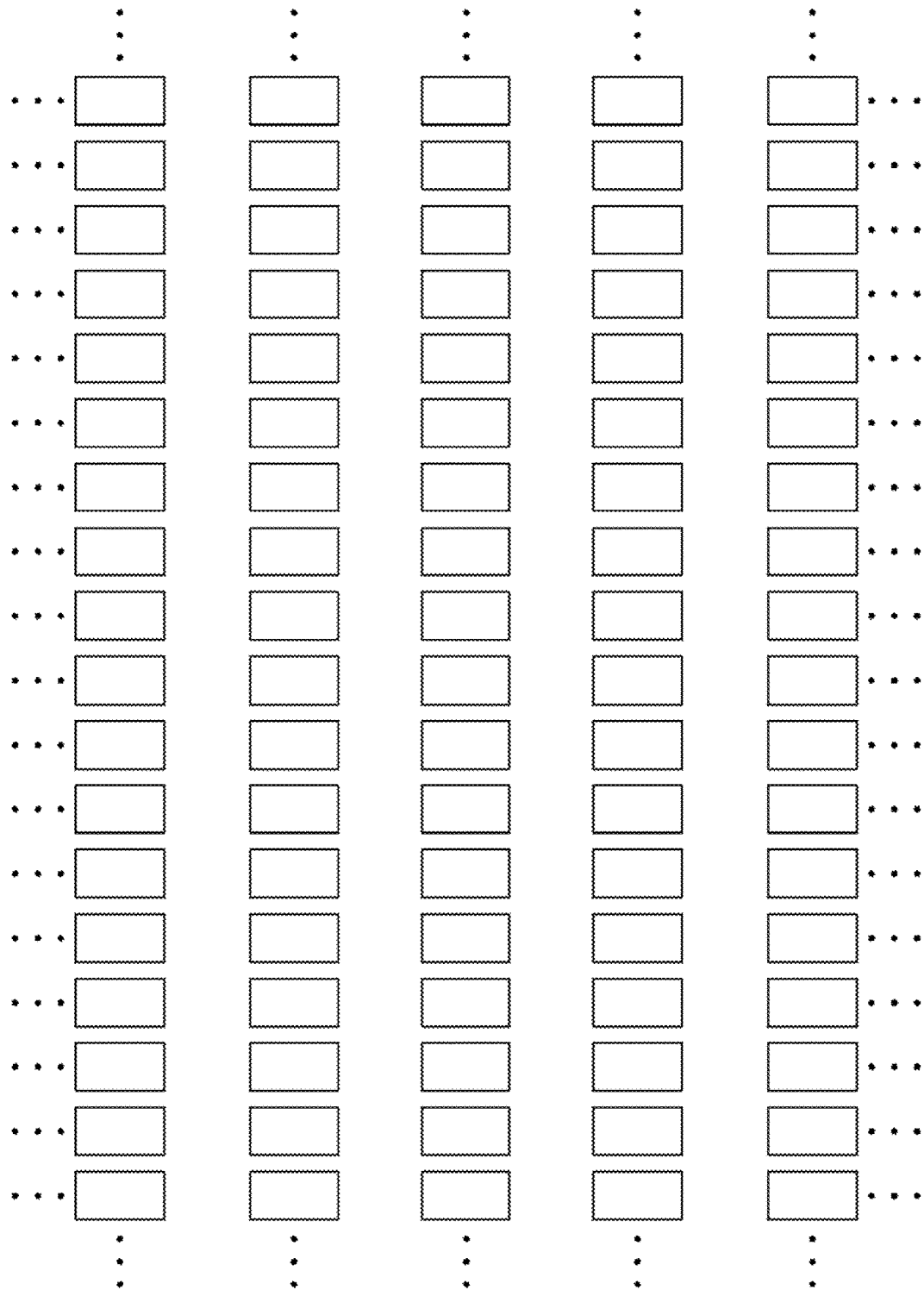
FIGS. 14A-C illustrate the application-topology-determination problem domain to which the current document is directed.
Figure 14B:
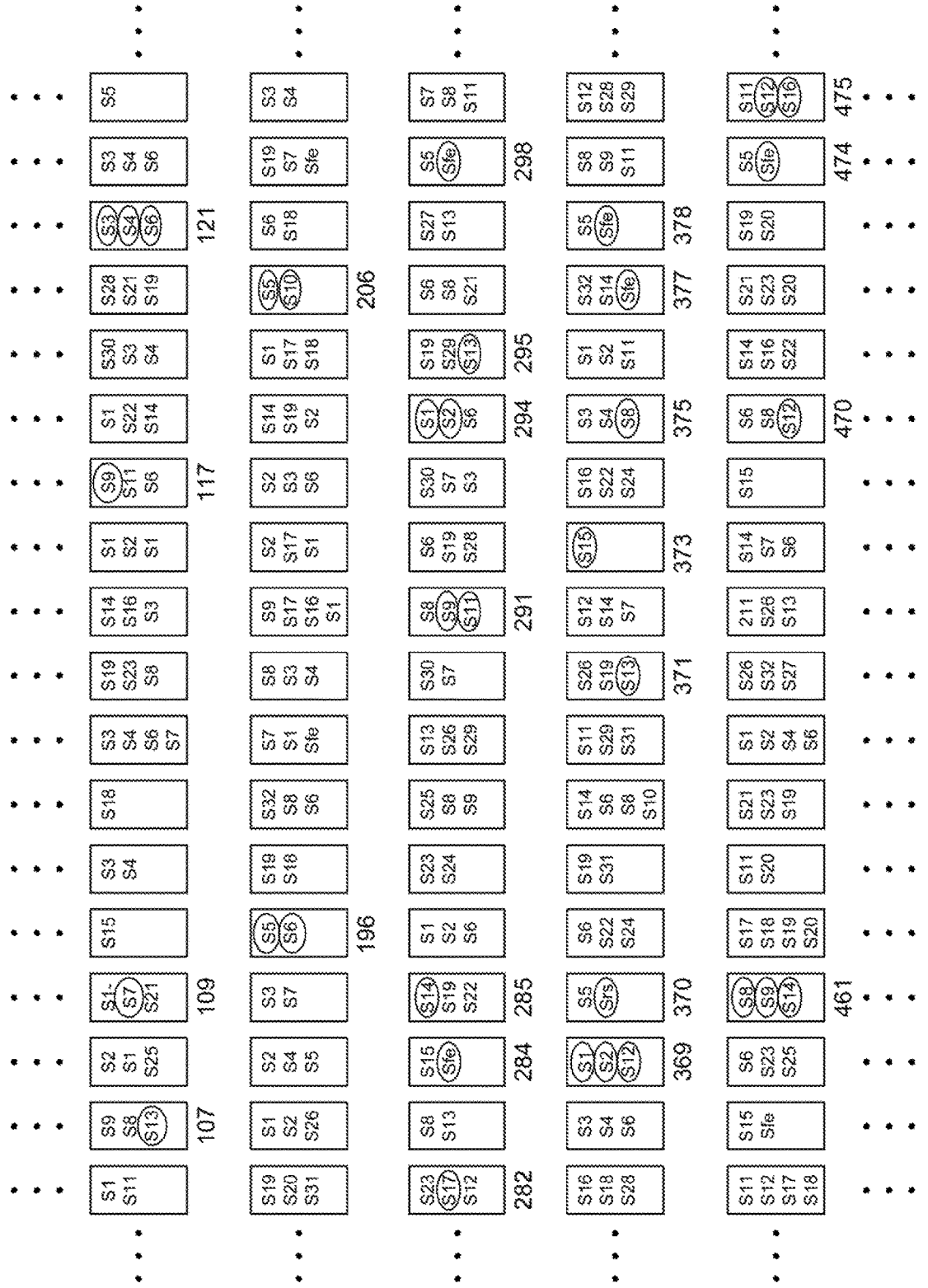
Figure 14C:
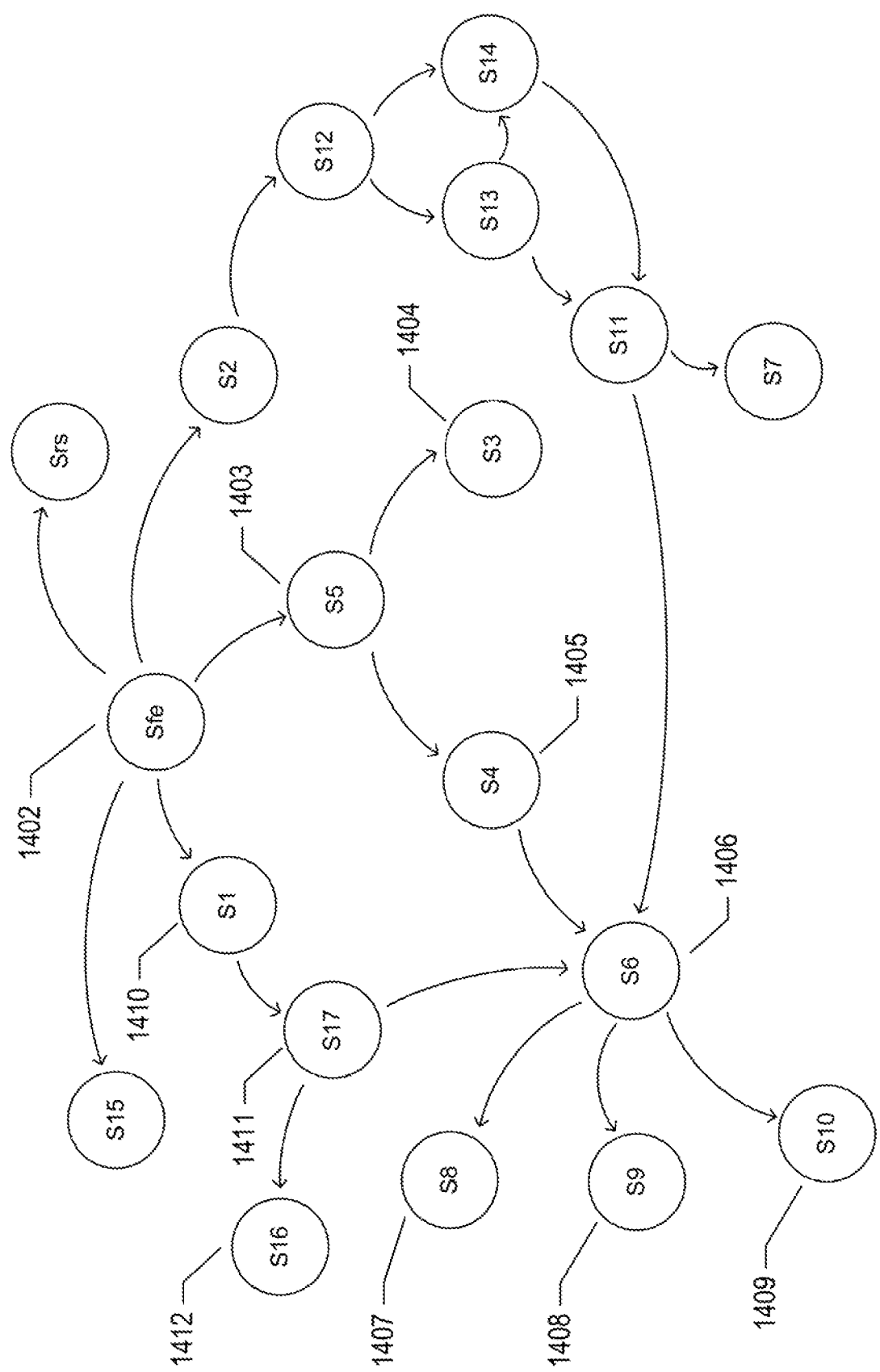

FIGS. 14A-C illustrate the application-topology-determination problem domain to which the current document is directed. In the simple example shown in FIG. 11, one might expect to be able to determine the services within the distributed computer system that together compose the distributed service-oriented application discussed with reference to FIG. 11. After all, there are only a relatively small number of servers and component-service instances present in the portion of the distributed computer system shown in FIG. 11. However, consider the more realistic computational environment inhabited by one or more distributed service-oriented applications shown in FIG. 14A. In a realistic a distributed-computing-system environment, there may be literally hundreds or thousands of server computers supporting concurrent execution of tens, hundreds, or more different distributed service-oriented applications. As shown in FIG. 14B, the service-component instances for the distributed service-oriented application discussed with reference to FIG. 11 may be widely dispersed throughout hundreds or thousands of servers that include many additional instances of the same types of service components employed by the distributed service-oriented application used by other distributed service-oriented applications. It is even possible that multiple distributed service-oriented applications share particular instances of certain of the service components. The service-component instances associated with the distributed service-oriented application discussed with reference to FIG. 11 are marked with surrounding ellipses in FIG. 14B. It would be a challenging task to identify them, among hundreds or thousands of other instances of the same types of services, let alone figure out how the cooperate to provide the distributed-service-oriented-application API.

FIG. 14C illustrates an example directed graph representing the topology of a distributed service-oriented application. Each node in the graph corresponds to a service node and the arrows indicate calls made by service nodes to other service nodes. The directed graph may include many different subgraphs, such as a sub graph corresponding to the call trace shown in FIG. 12B, for the various different entry-points of the distributed-services-oriented-application API. For example, the subgraph corresponding to the call trace shown in FIG. 12B consists of nodes 1402-1409. A different entry point might be implemented by the subgraph comprising nodes 1402 and 1410-1412. Thus, the problem domain to which the current document is directed is the problem of extracting a representation of a distributed-services-oriented-application topology, such as that shown in FIG. 14C, from a large distributed computing system, a portion of which is represented in FIG. 14A.

There have been various different technologies developed for addressing the current problem domain, discussed above. Many of these technologies depend on complex instrumentation of service-component executables and inclusion of agent processes within the servers of the distributed computer systems. Instrumentation-based and agent-based technologies suffer from significant code-modification and computational-overhead deficiencies, in addition to a large number of serious security concerns within multi-tenant data centers and cloud-computing facilities. Thus, managers and administrators of distributed computing systems and distributed applications continue to seek automated methods for determining the topologies of distributed service-oriented-applications within distributed computer systems that do not involve installation of agents, that do not involve complex code modification to introduce instrumentation within service-component code, and that do not raise security concerns for tenants of multi-tenant cloud-computing facilities and for users of computational resources provided by computational-resource providers.

Figure 15A:
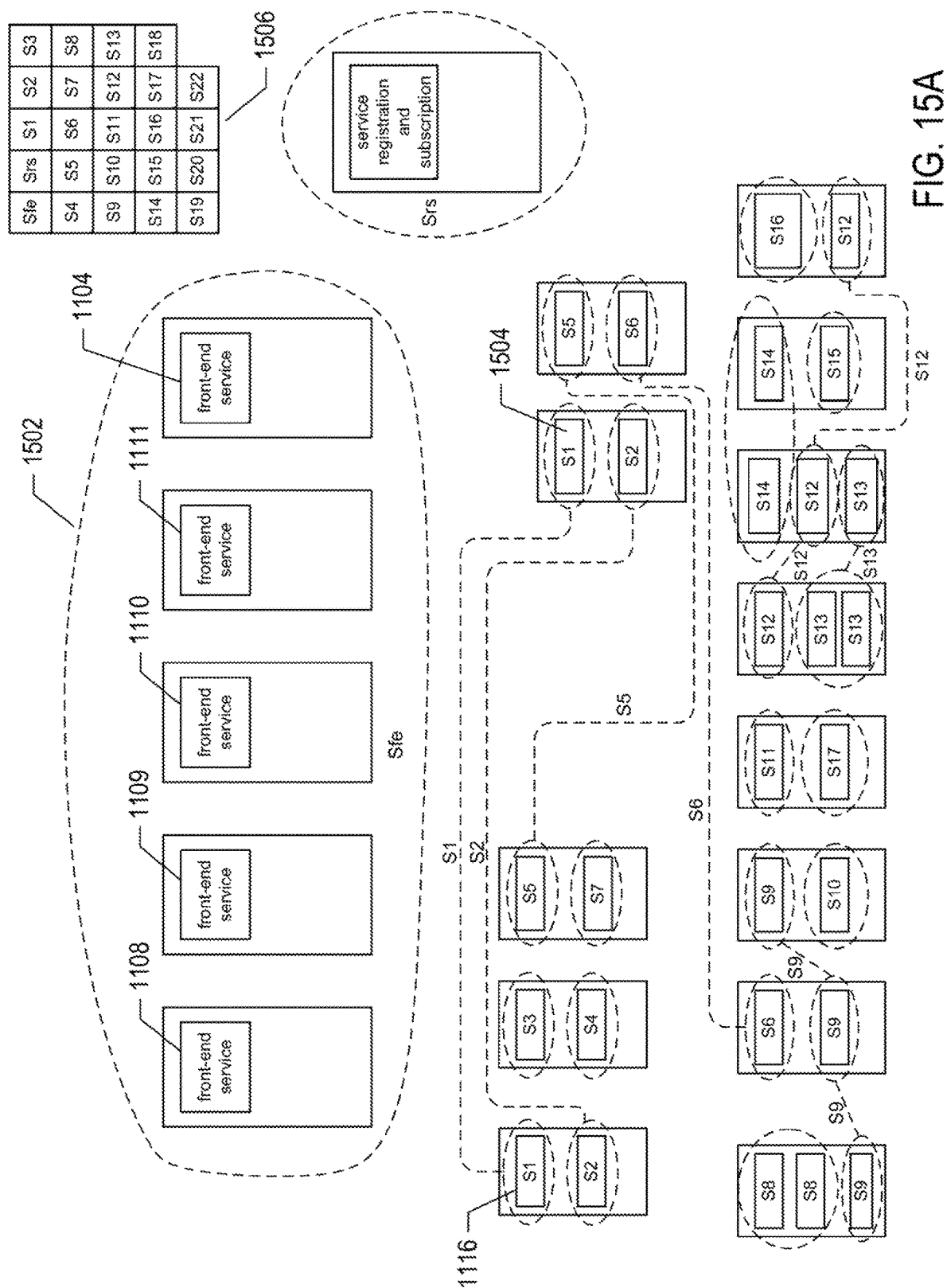
FIGS. 15A-C illustrate a portion of the general approach to determining distributed service-oriented-application topologies disclosed in the current document.
Figure 15B:
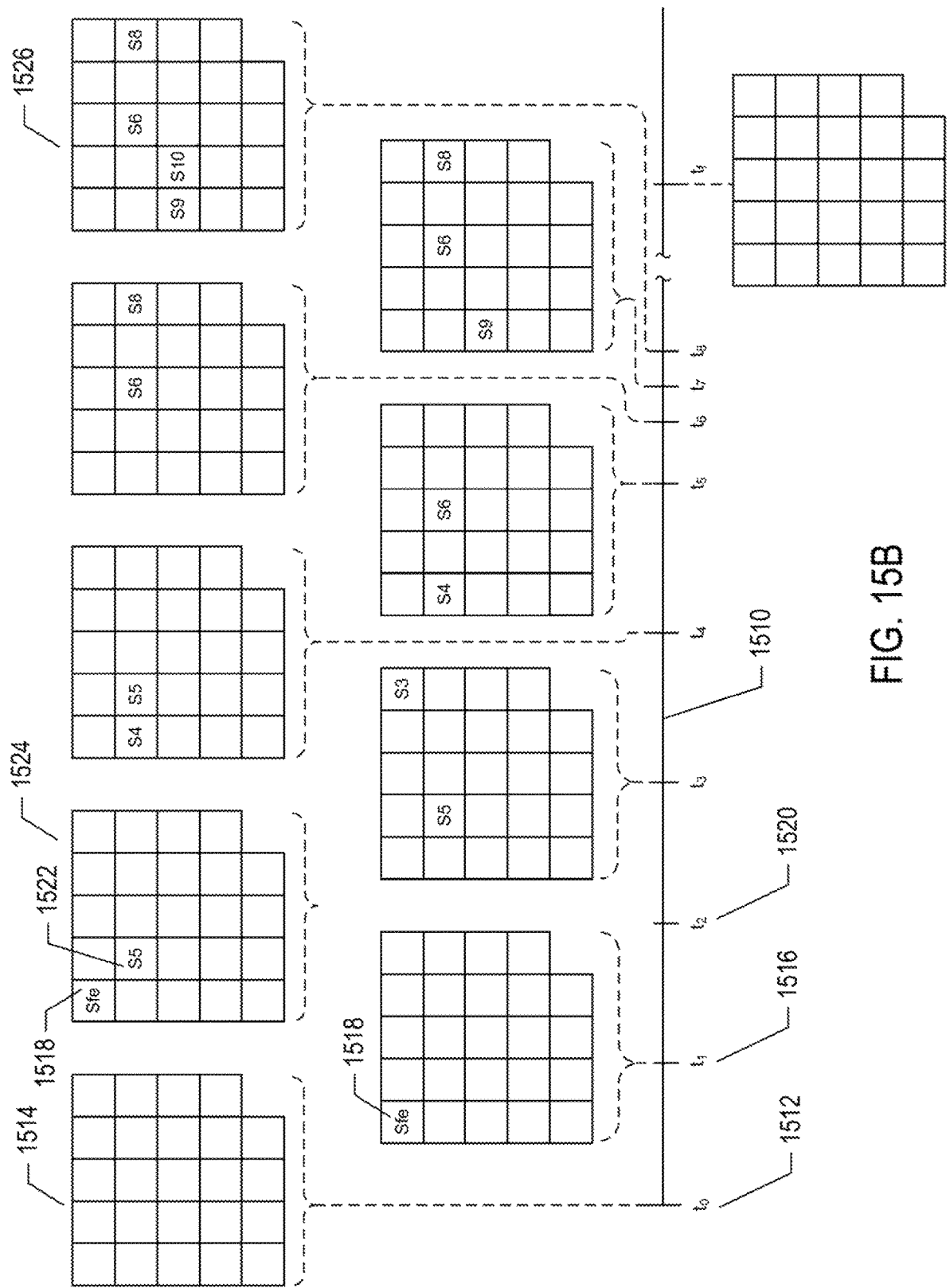
Figure 15C:
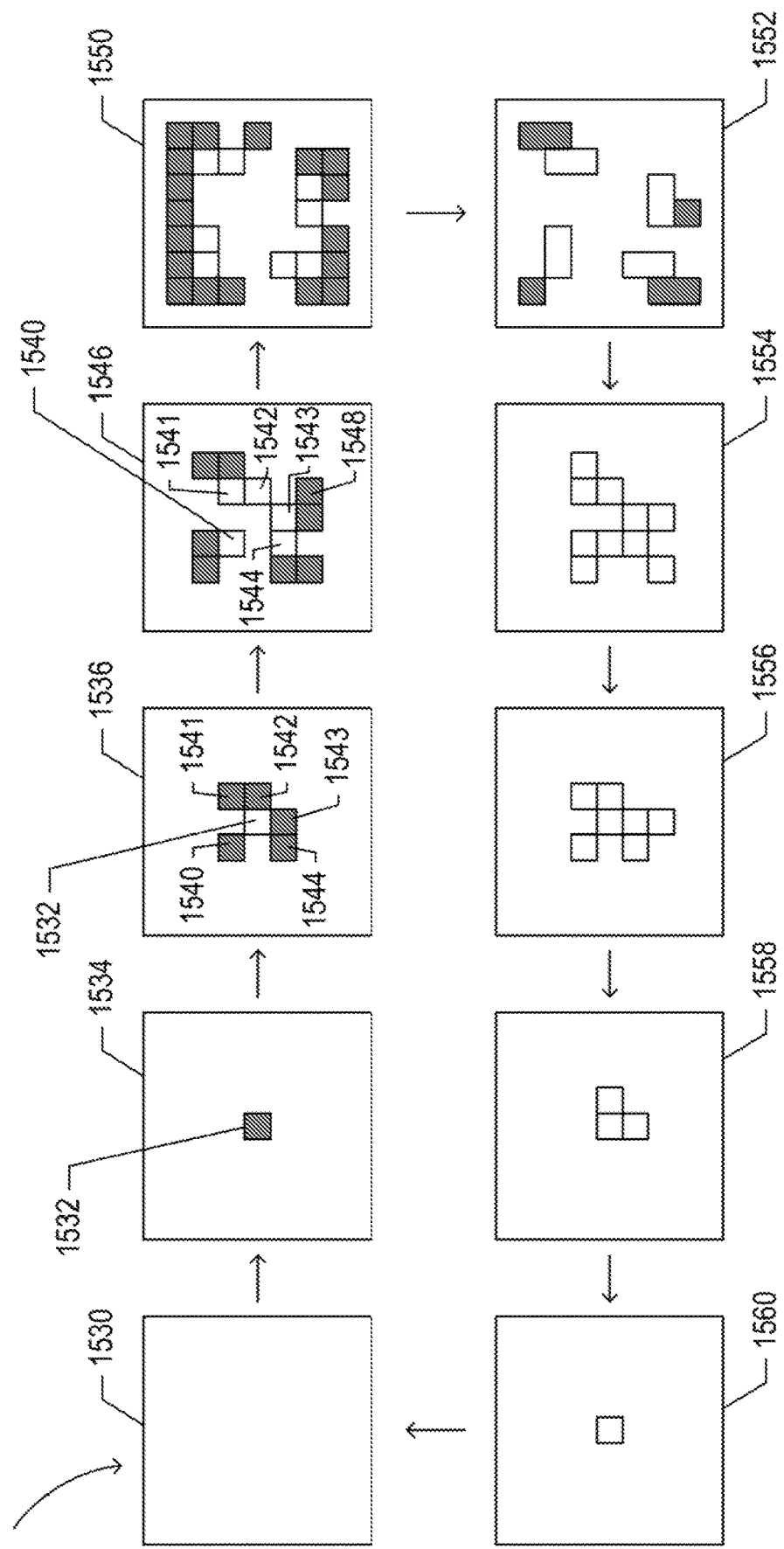

FIGS. 15A-C illustrate a portion of the general approach to determining distributed service-oriented-application topologies disclosed in the current document. Distributed service-oriented-application topologies provide the basis for of more wide variety of different utilities, facilities, and functionalities useful to managers and administrators of distributed computing systems. As one example, once the topology of a distributed-service-oriented application has been determined and encoded in a directed graph or alternative type of representation, managers and administrators can launch metric-collection utilities for collecting resource-usage metrics on a per-application basis. As another example, automated management tools can use the distributed-service-oriented-application topologies for automated migration of service-component instances within a distributed computing system to optimize resource usage and minimize network latencies.

FIG. 15A illustrates partitioning of the example distributed service-oriented application shown in FIG. 11 into service nodes. For example, the five front-end-service service components 1104 and 1108-1111 together comprise a front-end-service node 1502. As another example, the S1 service instances 1116 and 1504 together compose an S1 service node. The service nodes relevant to the example distributed service-oriented application are shown represented by a matrix-like representation 1506 in the upper right-hand corner of FIG. 15A.

FIG. 15B illustrates the temporal network disturbances that may be detected, through network metrics collected for service nodes, during execution of the request corresponding to the distributed-service-oriented-application API entry-point discussed above with reference to FIG. 12B. In an otherwise idle distributed-computer system, execution of the user request results in transient increases in network activity for the called and calling service components. Increases in network activity above a threshold level are referred to as network disturbances in the following discussion. These are recognized as increases in network-metric values, such as the number of kilobytes per second exchanged by a service node with other service nodes that participate in the distributed-service-oriented application. The temporal pattern of these disturbances is shown for execution of the example request discussed above with reference to FIG. 11 with respect to a horizontal timeline 1510 in FIG. 15B. At time $t_0$ 1512, the matrix-like representation of the relevant service nodes 1514 shows no increased network activity, or network disturbance, for any of the relevant service nodes. At time $t_1$ 1516, the front-end service node 1518 shows increased network activity due to communication between the remote user or client and the front-end service node, as indicated by the appearance of the label "Sfe" for the front-end service node in the cell of the matrix-like representation corresponding to that service node, as previously shown in the matrix-like representation 1506 in FIG. 15A. Then, at time $t_2$ 1520, network disturbances are detected, from the collected network metrics, for the front-end service node 1518 as well as the service node S5 1522 in matrix-like representation 1524. These disturbances occur because of the call by the front-end service node to service-node component S5. A traversal of the timeline and matrix-like representations associated with the labeled time points along the timeline reveals a pattern of network disturbances corresponding to the pattern of service-node calls and interactions for the request-execution illustrated in FIG. 12A and equivalently illustrated by the call trace shown in FIG. 12B. Note that, in some cases, service calls may be asynchronous with respect to other service calls made by a particular service node and result in concurrent execution of multiple service nodes, as appears to be the case when service nodes S6, S8, S9, and S10 are all showing network disturbances, in matrix-like representation 1526. In other cases, calls appear to be sequential.

FIG. 15C illustrates the general wave-like temporal pattern of network disturbances associated with execution of a representative distributed-oriented-service-application API entrypoint. In FIG. 15C, rectangles, such as rectangle 1530, correspond to the outer boundary of a matrix-like representation of the service nodes relevant to the distributed oriented-service application, similar to matrix-like representation 1506 in FIG. 15A. Initially, as shown in matrix-like representation 1530, there are no network disturbances. Upon reception of a user or client request by the distributed service-oriented application, a single component service node 1532 shows increased network activity in matrix-like representation 1534. At a next point in time, illustrated by matrix-like representation 1536, component service node 1532 continues to show a network disturbance but, in addition, a number of additional component service nodes 1540-1544 also show network disturbances. At a next point in time, represented by matrix-like representation 1546, component service node 1532 is no longer showing a network disturbance, but component service nodes 1540-1544 continued to show network disturbances and eight additional component service nodes, such as component service node 1548, also show network disturbances. The component service nodes showing disturbances, over time, propagate similar to a wave in a pond propagating from the point at which a stone fell into the pond, as one set of active component service nodes make calls to additional component service nodes. In the example shown in FIG. 15C, the wave of network disturbances propagate outward up to the point in time represented by matrix-like representation 1550 and then retracts over the period of time represented by matrix-like representations 1552-1560. Of course, the wave like pattern shown in FIG. 15C depends on placing the cells corresponding to component service nodes in a particular arrangement of concentric rings or squares corresponding to invocation times, but, regardless of the arrangement, node disturbances evolve over time within a logical space of service nodes by dynamically expanding or contracting patterns of network disturbances. By continuously collecting network metrics from relevant component service nodes, implementations of the currently disclosed methods and systems for determining distributed-service-oriented-application topologies can infer the directed subgraphs corresponding to execution of particular distributed-service-oriented-application API entrypoints, such as the directed subgraph corresponding to the call trace shown in FIG. 12B, and can generate a complete directed-graph representation of a distributed service oriented application, such as that shown in FIG. 14C. As discussed below, the information extracted from noise-disturbance patterns can be supplemented with call traces generated by a distributed-services call-trace service or application in order to most precisely identify AP-call subgraphs and application topologies.

Figure 16:
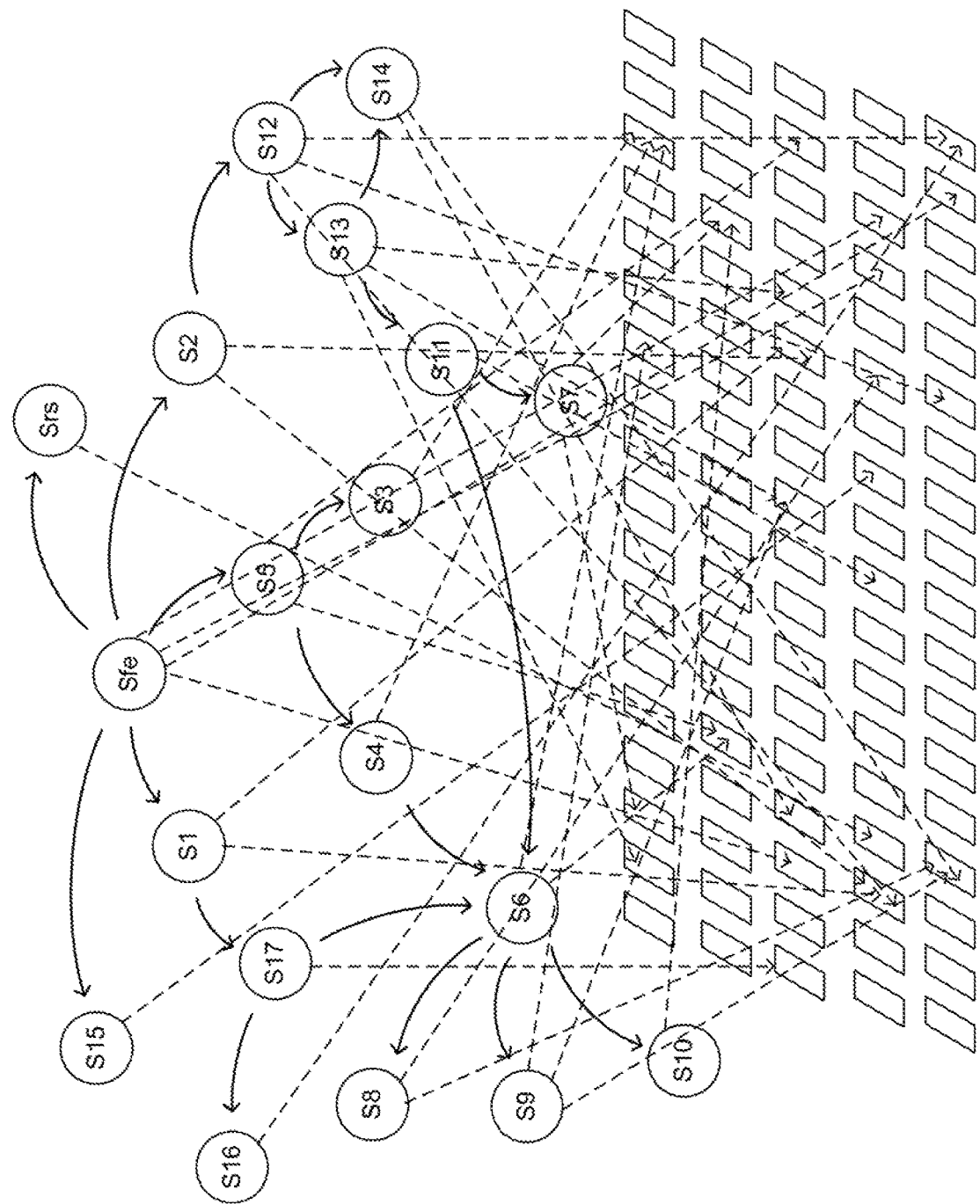
FIG. 16 illustrates a logical mapping of a directed-graph representation of a distributed service-oriented application to servers within a distributed computer system.

FIG. 16 illustrates a logical mapping of a directed-graph representation of a distributed service-oriented application to servers within a distributed computer system. Once a complete directed-graph representation of the topology of a distributed service oriented application has been determined, methods similar to the network-disturbance-based method used to determine the topology of the distributed service oriented application can be employed to map the service nodes that together compose the distributed service oriented application to component-service instances within the physical servers. Without first determining the topology of a distributed service-oriented application, it would be difficult or impossible to directly infer the servers and component-service instances corresponding to a particular distributed service-oriented application. The network-disturbance-based methods initially used to determine topologies is generally carried out on a relatively quiescent distributed computer system, in which the network disturbances can be readily discerned within the collected network metrics for service nodes. By contrast, servers, even in a largely idle system, are generally constantly communicating with remote computational entities, as a result of which it would be difficult or impossible to identify comparatively small changes in network activity associated with servers corresponding to execution of a user request by a distributed service-oriented application. However, once the topology of the distributed service-oriented application is known, such signals may be retrievable from network metrics collected both for service nodes as well as for servers. Mappings of distributed service-oriented applications to computational resources, such as servers, may provide even greater ranges of functionalities and utilities useful for system administrators and managers.

Figure 17A:
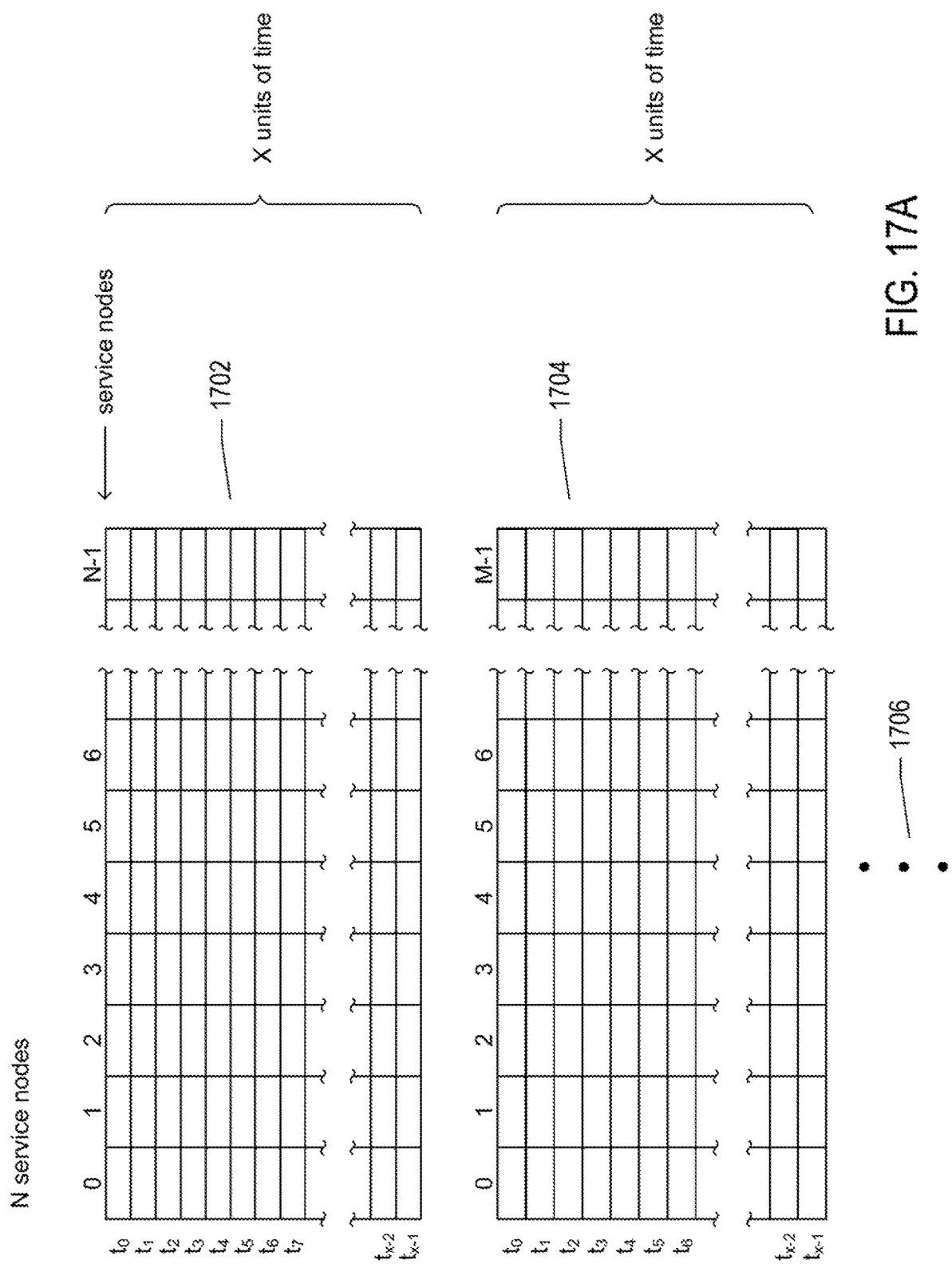

FIGS. 17A-F illustrate a method for extracting component-service-node-disturbance signals from observed network metrics used in certain implementations of the currently disclosed methods and systems. A component-service-node-disturbance signal is a related sequence of network disturbances associated with execution of a particular distributed service-oriented-application API entry point, such as the network disturbances illustrated in FIGS. 15B-C. FIG. 17A illustrates the metric data collected by the currently disclosed methods and systems from which the methods and systems extract component-service-node-disturbance signals. In the example shown in FIG. 17A, network data is collected from N service nodes. The network data is collected over multiple time periods, each time period consisting of x smaller units of time. Table 1702 in FIG. 17A represents the data collected from the N service nodes for a first time period. The table includes N columns corresponding to the N service nodes from which metric data is collected and x rows, each row corresponding to the metric data collected at a particular point of time within the time. Table 1704 represents the network metric data collected for the second time period and ellipsis 1706 indicates that data is collected for additional time periods.

Figure 17B:
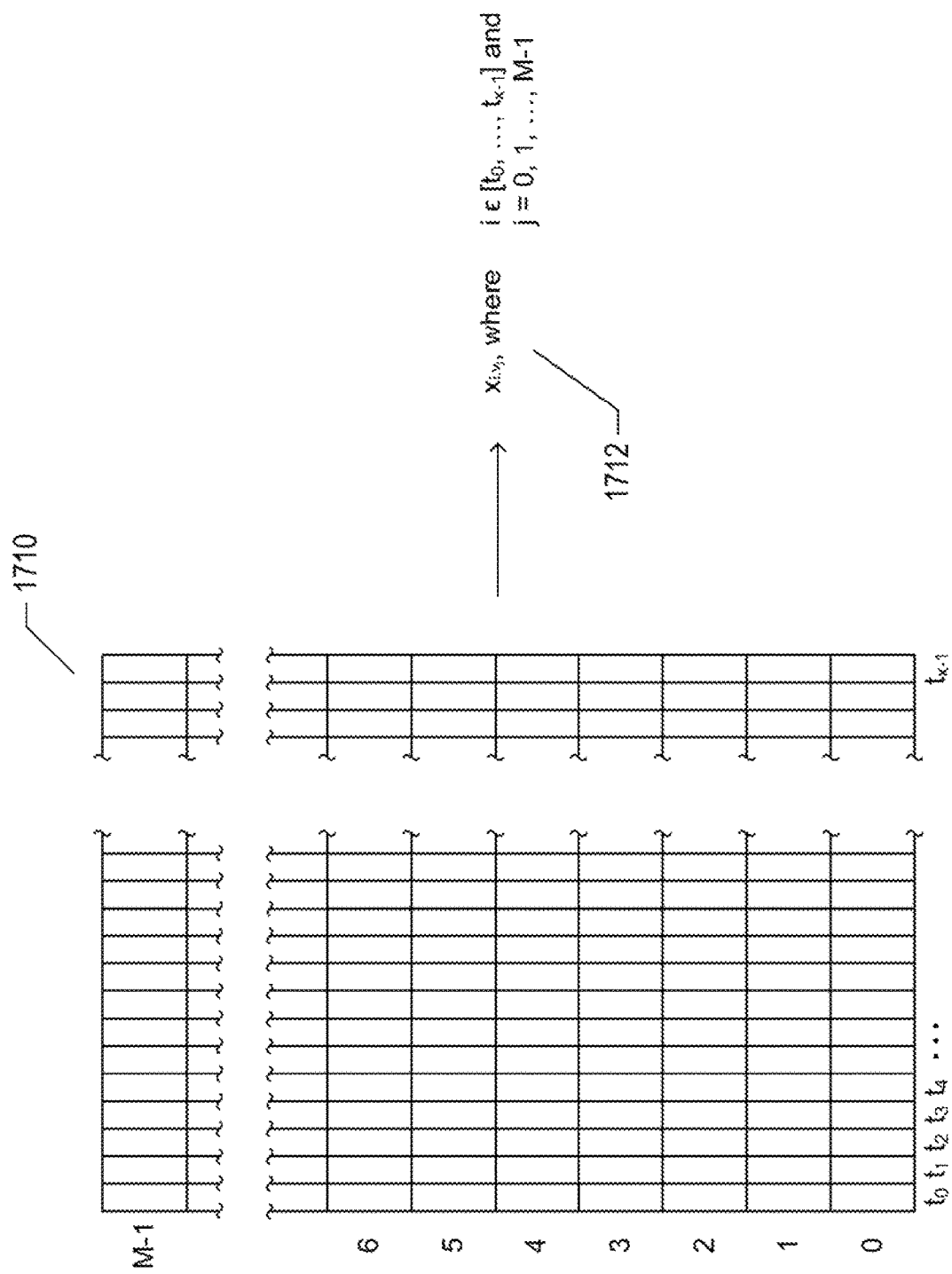

FIG. 17B illustrates a different way of looking at the metric data collected for a time period, discussed in FIG. 17A. In FIG. 17B, table 1702 from FIG. 17A is shown rotated by 90° in a counterclockwise direction 1710. Now, the rows represent metric data collected at the various time points within the time period for a particular service node and the columns represent the data collected at given time points. This data can be considered to be an observed signal 1712, with the data values at each point in time corresponding to the network activities of the service nodes. In essence, this observed signal is somewhat analogous to a conventional signal composed of multiple mixed harmonic component waves, with the values for each time point corresponding to amplitudes of the component harmonic waves.

Figure 17C:
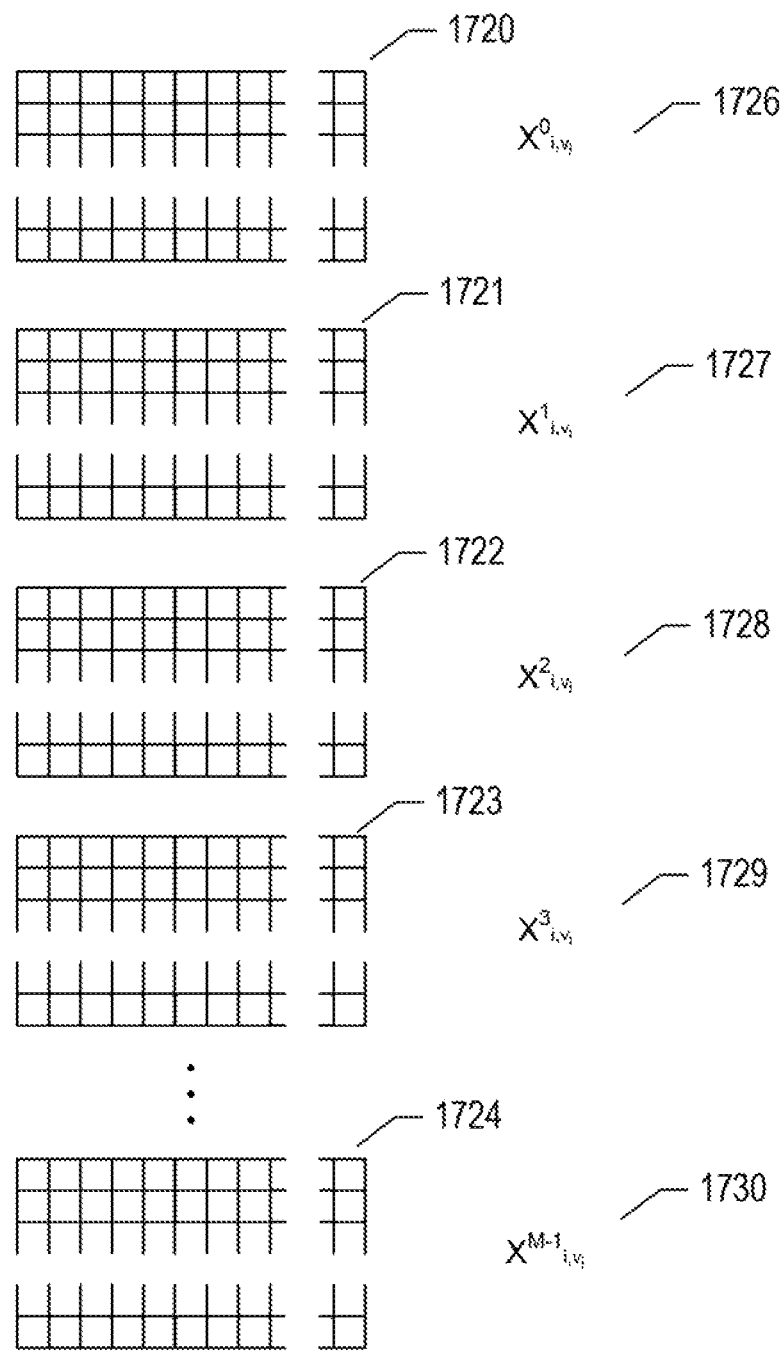

The signal is expressed as $x_{i,v_j}$, where i indicates the time-point within the time period and $v_j$ is a vector of network activity containing M entries. When i and j have specific numeric values, $x_{i,v_j}$ refers to a particular network-activity-metric value for service node j at time point i. M is equal to the number of component-service-node-disturbance signals desired to be extracted from the data. As shown in FIG. 17C, the network metric data collected during each time, represented by tables 1720-1724, corresponds to a set of observed signals 1726-1730. Data is collected for M time periods in order that the mixing matrix, discussed below, is a square matrix. M may be greater than the number of component-service-node-disturbance signals desired to be extracted from the data, in which case a pseudoinverse of the mixing matrix can be used in the method further detailed below.

FIG. 17D illustrates a single component-service-node-disturbance signal. In this figure, as in FIG. 17B, the rows of the table or matrix 1740 correspond to service nodes and the columns correspond to short time intervals within the overall time period. The cells of the matrix that includes asterisks, such as cell 1742, represent service nodes at particular points in time that exhibit greater than a threshold level of network activity corresponding to a service-node disturbance. The component-service-node-disturbance signal corresponds to sequence of component-service-node calls shown in FIG. 12A and the call trace shown in FIG. 12B. Thus, each component-service-node-disturbance signal extracted from the observed mixed signals corresponds to a pattern of node disturbances that, in turn, correspond to execution of a particular distributed-service-oriented-application API entry point. Component-service-node-disturbance signals are expressed in similar fashion to observed signals, as indicated by notation 1744 in FIG. 17D.

FIGS. 17E-F illustrate the independent component analysis ("ICA") method for extracting component-service-node-disturbance signals s from observed mixed signals x. The set of mixed signals collected over multiple time periods is represented by the vector x 1746. Note that this vector is a vector of signals, rather than a vector of scalars. Similarly, the set of M component-service-node-disturbance signals desired to be extracted from the observed mixed signals x is represented by the vector s 1748. The observed signal corresponding to the $k^{th}$ time period is a linear combination of terms, each comprising a weighted component-service-node-disturbance signal. The weights can be collected into a matrix A 1752, referred to as the "mixing matrix." Each element in the mixing matrix is a vector of scalar weights, one for each time point within the time period corresponding to each signal. The observed signals, represented as a column vector 1754, are then obtained by left multiplication of a column vector of component-service-node-disturbance signals 1756 by the mixing matrix A 1752. In order to extract the component-service-node-disturbance signals 1756, the column vector of observed signals 1754 is left multiplied by the inverse of matrix A 1758. The inverse of matrix A is referred to as the "unmixing matrix" and represented as W. As shown in FIG. 17F, the probability that a particular service node j at a particular time point i within a service-node-disturbance signal k is exhibiting a noise disturbance is represented by the notation 1762. Using this notation, a mutual-information for two different service-node-disturbance signals x and y can be expressed as shown in expression 1764. An aggregate mutual information metric for the set of M service-node-disturbance signals is given by expression 1766. In order to extract service-node-disturbance signals from the observed mixed signals, or collected metric data over multiple time periods, an optimization problem, represented by expression 1768, is carried out in which a search is made over the space of matrices W and the space of sets of service-node-disturbance signals for a matrix W and a set of service-node-disturbance signals a which minimize the aggregate mutual information I(s) of the set of service-node-disturbance signals. Various different types of optimization methods can be used, including gradient-descent methods.

Figure 18:
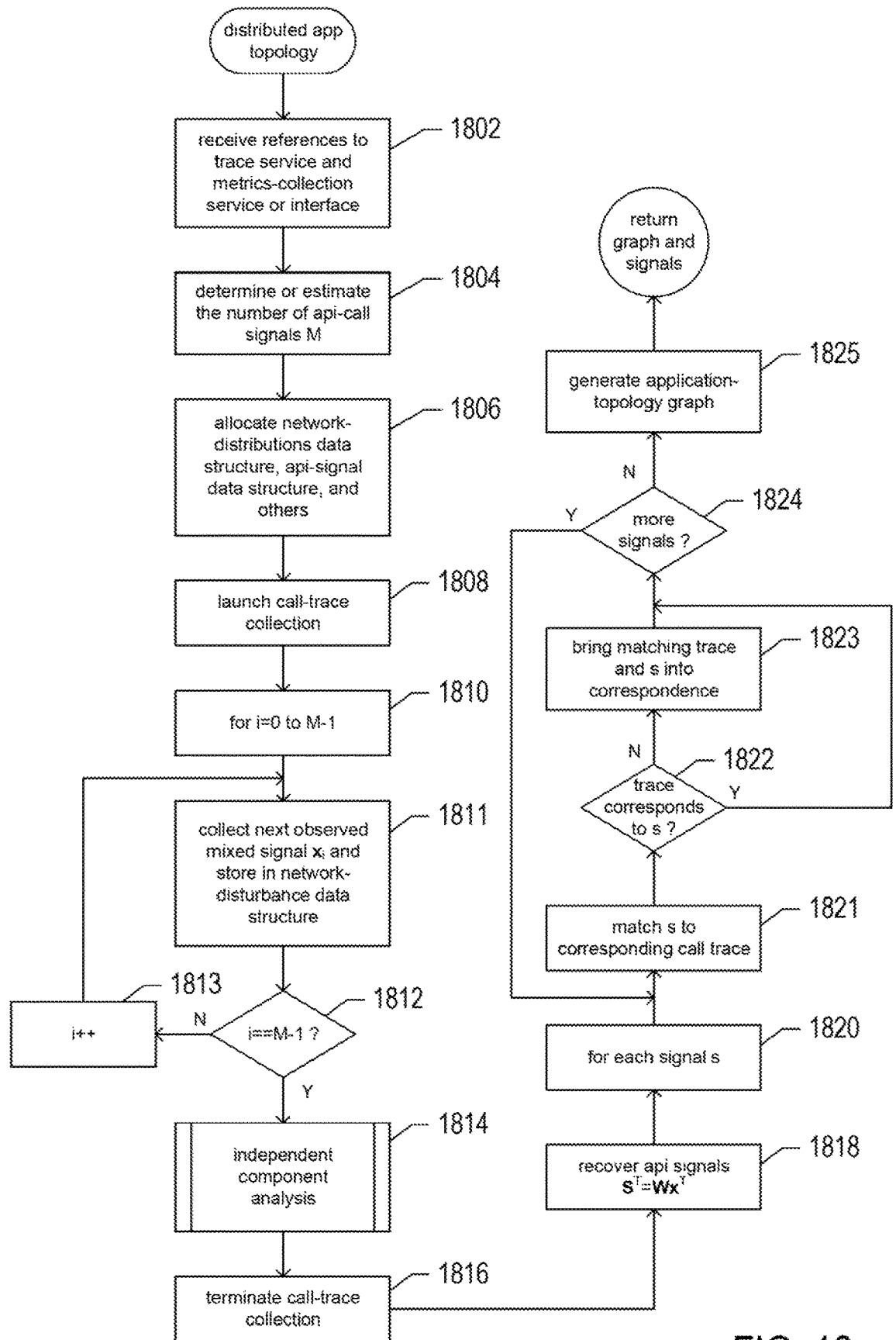
FIG. 18 provides a control-flow diagram for an implementation of the currently disclosed method for determining the topology of a distributed service-oriented application.

FIG. 18 provides a control-flow diagram for an implementation of the currently disclosed method for determining the topology of a distributed service-oriented application. In step 1802, the method receives references to a distributed-service call-trace service or application and a metrics-collection service or interface. In step 1804, the method determines the number M of service-node-disturbance signals desired to be extracted from the observed network data. In step 1806, data structures are allocated for storing the collected network metric data, the extracted service-node-disturbance signals, a directed graph or graphs representing a distributed-service-oriented-application topology, and other information produced by the method. In step 1808, the method launches call-trace collection by the distributed-service call-trace service. In the for-loop of steps 1810-1813, the method collects the network metric data over M time periods, as discussed above with reference to FIG. 17A-C. In step 1814, the method carried out the independent-component-analysis method, discussed above with reference to FIGS. 17E-F, to extract service-node-disturbance signals from the observed data and, in step 1816, terminates call-trace collection. The individual service-node-disturbance signals are recovered, in step 1818. In the for-loop of steps 1820-1824, each extracted service-node-disturbance signal is matched to a corresponding call trace, in step 1821, and when the best matching call trace does not exactly correspond to the service-node-disturbance signal, as determined in step 1822, the service-node-disturbance signal and call trace are brought into correspondence, generating a directed subgraph corresponding to execution of a distributed-service-oriented-application API entrypoint. In many cases, a call trace may reveal nodes and edges of a subgraph that were not detected by processing the network-disturbance data, due to noise or to interference from network activity arising from other sources. In step 1825, the directed subgraphs obtained in the for-loop of steps 1820-1824 are combined together to generate a directed graph representing the topology of the distributed service-oriented application. As discussed above, initial application-topology determination may be carried out on a relatively idle distributed computer system, to increase the signal-to-noise ratio of network disturbances of interest, although use of independent component analysis allows extraction of service-node-disturbance signal from complex observed signals generated by multiple, concurrent executing distributed-service-oriented application API entrypoints.

Figure 19:
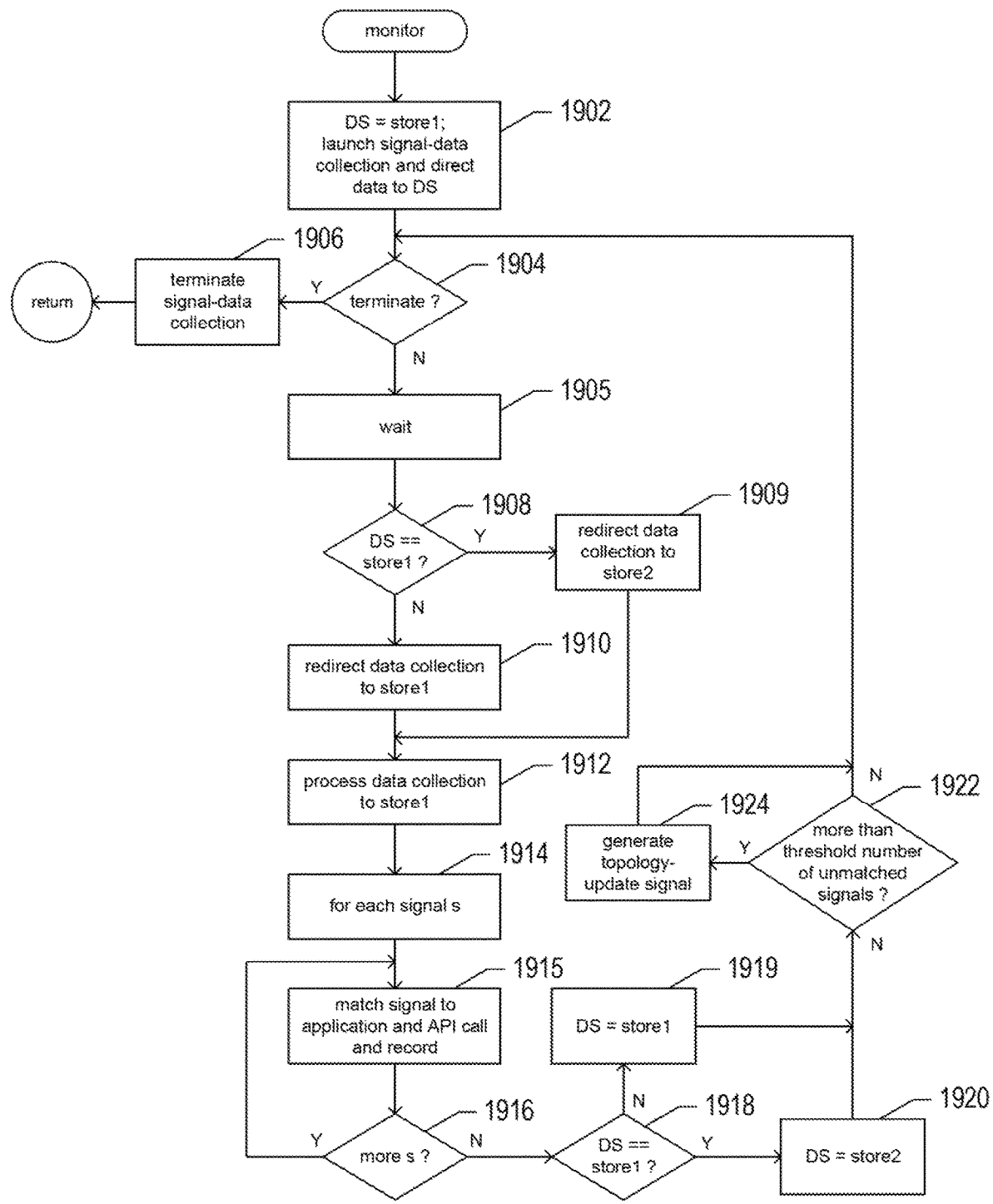
FIG. 19 illustrates a monitoring method that may be incorporated into a variety of different distributed-computing-system management and administration tools that uses a distributed-service-orientated-application topologies, determined by the method illustrated in FIG. 18.

FIG. 19 illustrates a monitoring method that uses distributed-service-orientated-application topologies and that may be incorporated into a variety of different distributed-computing-system management and administration tools. In step 1902, the monitoring method sets the local variable DS to reference a first data store and launches collection of network metric data, directing the collected data to the data store referenced by the local variable DS. If a termination condition for the monitor has arisen, as determined in step 1904, data collection is terminated in step 1906 and the monitor returns. In step 1905, the monitor waits for an appropriate data-collection period. In steps 1908-1910, following the waiting period, DS is set to direct data to the other of the two data stores used for collecting data. In step 1912, the most recently collected data is processed to recover API-call signals corresponding to execution of distributed service-orientated-application API entrypoints. In the for-loop of steps 1914-1916, each collected signal is matched to a particular distributed application and API call, using application topologies previously determined by the method of FIG. 18. Once a match if found, the monitor may update a count for the API call, obtain and store metrics associated with the API call, or carry out other such tasks. In steps 1918-1920, the local variable DS is updated to reference the other of the two data stores. When more than a threshold number of the extracted service-node-disturbance signals are unable to be matched to applications and API calls, as determined in step 1922, a signal or call back is made, in step 1924, to initiate generation of an application-topology update. Processing of the collected data to extract API-call signals, in step 1912, and updating application topologies, in step 1924, are generally much more computationally efficient than initial determination of application topologies, discussed with reference to FIG. 18. In these cases, the optimization problem becomes more like a refinement problem, since the state space searches are far better bounded and constrained by the know application topologies. Furthermore, call traces are not needed for processing of the collected data to extract API-call signals, in step 1912, again because the full application topologies are known. Call tracing, unlike network-disturbance monitoring, does impact, even is slightly, service execution and involves additional computational overheads, and is therefore only generally used during initial application-topology determination or when an extensive update to the application topologies is required sue to the presence of new distributed service-oriented applications or significant changes to the APIs of the distributed service-oriented applications being monitored.

The above described methods may be incorporated in numerous systems, including topology-determining services, management servers that manage data centers, virtual data centers, and cloud-computing facilities, and various management-and-administration applications. These systems may be implemented in single computer systems or in distributed computer systems.

The present invention has been described in terms of particular embodiments, it is not intended that the invention be limited to these embodiments. Modifications within the spirit of the invention will be apparent to those skilled in the art. For example, any of many different implementations can be obtained by varying various design and implementation parameters, including modular organization, control structures, data structures, hardware, operating system, and virtualization layers, and other such design and implementation parameters. As discussed above, there are many different types of machine-learning approaches and technologies that can be used to associate application-program states with screen-capture images in addition to, volitional neural networks. Various different implementations may monitor only a single executing application at a time, unlike the disclosed implementation in which multiple executing application programs are monitored concurrently. Similarly, certain implementations may monitor one or more executing application programs for only a single operation, rather than for the occurrence of multiple operations, as in the above-described implementation. Any of many different operating-system features or specifically-encoded tools can be used for screen capture and detection of relevant user-interface events.

What is claimed is:

1. A system that determines a service-call-based topology of one or more distributed service-oriented applications, each including multiple component services, the system comprising:
   one or more processors;
   one or more memories; and
   computer instruction, stored in one or more of the memories that, when executed by one or more of the processors, control the system to
      collect network metrics for each of multiple service nodes at multiple time points within each of multiple time intervals, each service node comprising one or more instances of a component-service of one or more of the one or more distributed service-oriented applications,
      employ an independent-component-analysis method to extract component-service-node-disturbance signals from the collected network metrics,
      generate a representation of a set of time-associated component-service-node calls for each of multiple API entrypoints of one or more distributed service-oriented applications using the extracted component-service-node-disturbance signals,
      assemble the representations of the set of time-associated component-service-node calls to generate representations of the service-call-based topologies of one or more distributed service-oriented applications, and
      provide the service-call-based topology representations to one or more administration and/or management systems and services that provide management and administration utilities for managing distributed computer system and or distributed service-oriented applications.

2. The system of claim 1
   wherein the network metrics collected for a service node include aggregate metrics for multiple component-service instances that together compose the service node; and
   wherein network metrics are include numerical values from which the system can determine increased network-communications activity for particular service nodes during particular time intervals, where increased network-communications activity is network activity above a threshold level.

3. The system of claim 2 wherein a network metric indicates a number of data units transferred between a service node and remote computational entities during a particular time interval or a rate of data transfer between the service node and remote computational entities during a particular time interval.

4. The system of claim 2 wherein the collected network metrics are stored as observed signals, one for each time period, that include network-activity indications for each of multiple service nodes at each time point.

5. The system of claim 1 wherein each set of time-associated component-service-node calls is represented by a directed graph that includes nodes corresponding to service nodes and edges representing calls from a call-initiating service node to a target service node.

6. The system of claim 1 wherein each service-call-based-topology representation is a directed graph that includes nodes corresponding to service nodes and edges representing calls from a call-initiating service node to a target service node and that includes, as subgraphs, the directed graphs corresponding to each of multiple entrypoints of the API provided by the application.

7. The system of claim 1 further including:
additionally collecting call-trace data for the multiple service nodes; and
when the call trace for a particular API entrypoint is not an equivalent to a representation of a set of time-associated component-service-node calls generated from a component-service-node-disturbance signal extracted from the collected network metrics corresponding to the particular API entrypoint, modifying the representation of the set of time-associated component-service-node calls to bring the representation of the set of time-associated component-service-node calls into correspondence with the call trace.

8. The system of claim 1 wherein the independent-component-analysis method determines a set of component-service-node-disturbance signals and an unmixing matrix that minimized the aggregate mutual information among the component-service-node-disturbance signals.

9. The system of claim 8 wherein the set of component-service-node-disturbance signals is obtained from a set of observed signals by left multiplication of a vector representing the set of observed signals by the unmixing matrix.

10. A method that determines a service-call-based topology of one or more distributed service-oriented applications, each including multiple component services, the method comprising:
collecting network metrics for each of multiple service nodes at multiple time points within each of multiple time intervals, each service node comprising one or more instances of a component-service of one or more of the one or more distributed service-oriented applications,
employing an independent-component-analysis method to extract component-service-node-disturbance signals from the collected network metrics,
generating a representation of a set of time-associated component-service-node calls for each of multiple API entrypoints of one or more distributed service-oriented applications using the extracted component-service-node-disturbance signals,
assembling the representations of the set of time-associated component-service-node calls to generate representations of the service-call-based topologies of one or more distributed service-oriented applications, and
provide the service-call-based topology representations to one or more administration and/or management systems and services that provide management and administration utilities for managing distributed computer system and/or distributed service-oriented applications.

11. The method of claim 10
wherein the network metrics collected for a service node include aggregate metrics for multiple component-service instances that together compose the service node; and
wherein network metrics are include numerical values from which the system can determine increased network-communications activity for particular service nodes during particular time intervals.

12. The method of claim 11 wherein a network metric indicates a number of data units transferred between a service node and remote computational entities during a particular time interval or a rate of data transfer between the service node and remote computational entities during a particular time interval.

13. The system of claim 11 wherein the collected network metrics are stored as observed signals, one for each time period, that include network-activity indications for each of multiple service nodes at each time point.

14. The method of claim 10 wherein each set of time-associated component-service-node calls is represented by a directed graph that includes nodes corresponding to service nodes and edges representing calls from a call-initiating service node to a target service node.

15. The method of claim 10 wherein each service-call-based-topology representation is a directed graph that includes nodes corresponding to service nodes and edges representing calls from a call-initiating service node to a target service node and that includes, as subgraphs, the directed graphs corresponding to each of multiple entrypoints of the API provided by the application.

16. The method of claim 10 further including:
additionally collecting call-trace data for the multiple service nodes; and
when the call trace for a particular API entrypoint is not an equivalent to a representation of a set of time-associated component-service-node calls generated from a component-service-node-disturbance signal extracted from the collected network metrics corresponding to the particular API entrypoint, modifying the representation of the set of time-associated component-service-node calls to bring the representation of the set of time-associated component-service-node calls into correspondence with the call trace.

17. The method of claim 10 wherein the independent-component-analysis method determines a set of component-service-node-disturbance signals and an unmixing matrix that minimized the aggregate mutual information among the component-service-node-disturbance signals.

18. The method of claim 17 wherein the set of component-service-node-disturbance signals is obtained from a set of observed signals by left multiplication of a vector representing the set of observed signals by the unmixing matrix.

19. A physical data-storage device encoded with computer instructions that, when executed by one or more processors of a computer system, control the computer system to determine a service-call-based topology of one or more distributed service-oriented applications, each including multiple component services, by:
collecting network metrics for each of multiple service nodes at multiple time points within each of multiple time intervals, each service node comprising one or more instances of a component-service of one or more of the one or more distributed service-oriented applications,
employing an independent-component-analysis method to extract component-service-node-disturbance signals from the collected network metrics,
generating a representation of a set of time-associated component-service-node calls for each of multiple API entrypoints of one or more distributed service-oriented applications using the extracted component-service-node-disturbance signals,
assembling the representations of the set of time-associated component-service-node calls to generate representations of the service-call-based topologies of one or more distributed service-oriented applications, and
provide the service-call-based topology representations to one or more administration and/or management systems and services that provide management and administration utilities for managing distributed computer system and/or distributed service-oriented applications.

20. The physical data-storage device of claim 19 wherein determination of the service-call-based topology further includes: additionally collecting call-trace data for the multiple service nodes; and when the call trace for a particular API entrypoint is not an equivalent to a representation of a set of time-associated component-service-node calls generated from a component-service-node-disturbance signal extracted from the collected network metrics corresponding to the particular API entrypoint, modifying the representation of the set of time-associated component-service-node calls to bring the representation of the set of time-associated component-service-node calls into correspondence with the call trace.

* * * * *